United States Patent [19]

Kantner et al.

[11] Patent Number: 5,163,498
[45] Date of Patent: Nov. 17, 1992

[54] METHOD OF FORMING METAL MATRIX COMPOSITE BODIES HAVING COMPLEX SHAPES BY A SELF-GENERATED VACUUM PROCESS, AND PRODUCTS PRODUCED THEREFROM

[75] Inventors: Robert C. Kantner, Newark; Ratnesh K. Dwivedi, Wilmington, both of Del.

[73] Assignee: Lanxide Technology Company, LP, Newark, Del.

[21] Appl. No.: 433,027

[22] Filed: Nov. 7, 1989

[51] Int. Cl.⁵ .............................................. B22D 19/14
[52] U.S. Cl. ........................................ 164/97; 164/98; 164/100
[58] Field of Search ...................... 164/80, 91, 97, 100, 164/101, 102, 103, 104, 105

[56] References Cited

U.S. PATENT DOCUMENTS

| | | | |
|---|---|---|---|
| 3,396,777 | 8/1968 | Reding | 164/97 |
| 3,547,180 | 12/1970 | Cochran et al. | 164/97 |
| 4,739,817 | 4/1988 | Hamajima et al. | 164/97 |
| 4,802,524 | 2/1989 | Donomoto | 164/97 |
| 4,828,008 | 5/1989 | White et al. | 164/97 |
| 4,871,008 | 10/1989 | Dwivedi et al. | 164/97 |
| 4,932,099 | 6/1990 | Corwin | 164/97 |

FOREIGN PATENT DOCUMENTS 0364963 4/1990 European Pat. Off. .
51-000551 1/1976 Japan ........................................ 164/80

*Primary Examiner*—Richard K. Seidel
*Assistant Examiner*—Rex E. Pelto
*Attorney, Agent, or Firm*—Mark G. Mortenson; Carol A. Lewis; Stanislav Antolin

[57] ABSTRACT

The present invention relates to a novel process for forming net or near net-shape metal matrix composite bodies. Particularly, a molten matrix metal is in contact with a filler material or a preform in the presence of a reactive atmosphere, at least at some point during the process, which permits molten matrix metal to react, at least partially or substantially completely, with the reactive atmosphere, thereby causing molten matrix metal to infiltrate the filler material or preform due to the creation of a self-generated vacuum. Forming a glassy seal on the reaction system, the self-generated vacuum infiltration occurs without the application of any external pressure or vacuum. The molten matrix metal infiltrates the filler material up to at least a portion of a provided barrier means.

70 Claims, 15 Drawing Sheets

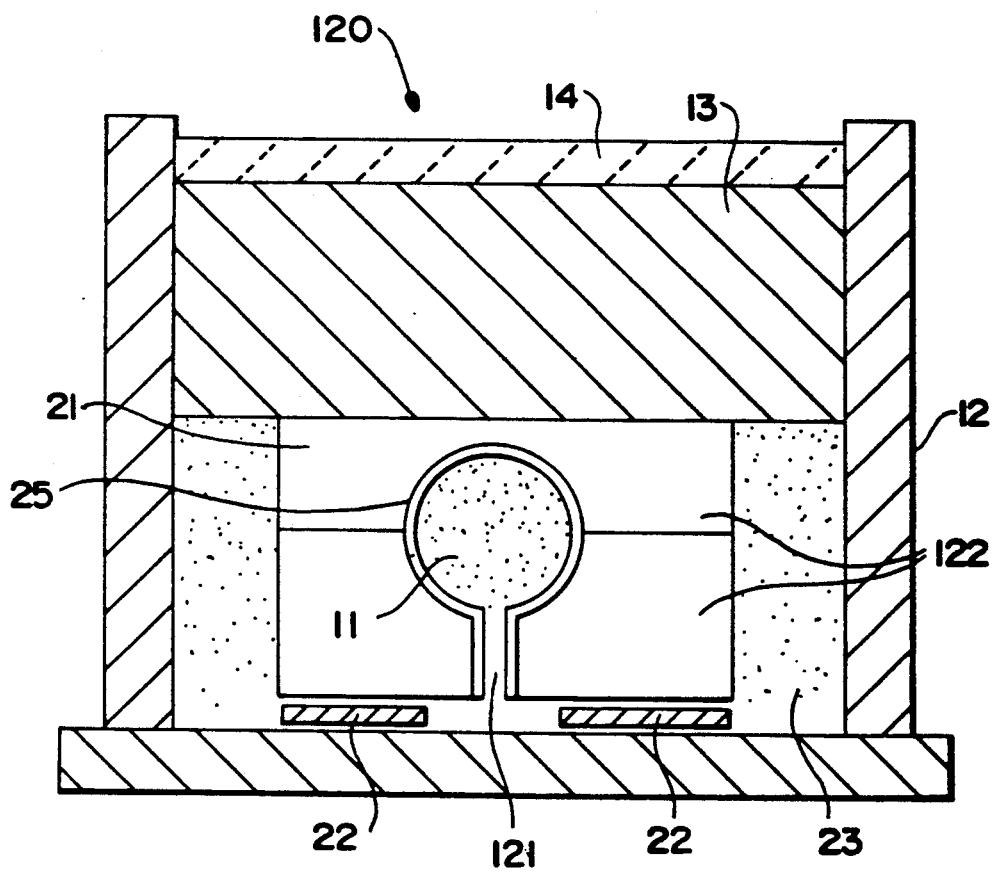
Fig_ 14

METHOD OF FORMING METAL MATRIX COMPOSITE BODIES HAVING COMPLEX SHAPES BY A SELF-GENERATED VACUUM PROCESS, AND PRODUCTS PRODUCED THEREFROM

FIELD OF THE INVENTION

The present invention relates to forming metal matrix composite bodies. Particularly, a molten matrix metal is contacted with a filler material or a preform in the presence of a reactive atmosphere, and, at least at some point during the process, the molten matrix metal reacts, either partially or substantially completely, with the reactive atmosphere, thereby causing the molten matrix metal to infiltrate the filler material or preform due to, at least in part, the creation of a self-generated vacuum. Such self-generated vacuum infiltration occurs without the application of any external pressure or vacuum.

BACKGROUND OF THE INVENTION

Composite products comprising a matrix metal and a strengthening or reinforcing phase such as ceramic particulates, whiskers, fibers or the like show great promise for a variety of applications because they combine some of the stiffness and wear resistance of the reinforcing phase with the ductility and toughness of the metal matrix. Generally, a metal matrix composite will show an improvement in such properties as strength, stiffness, contact wear resistance, and elevated temperature strength retention relative to the matrix metal in monolithic form, but the degree to which any given property may be improved depends largely on the specific constituents, their volume or weight fraction, and how they are processed in forming the composite. In some instances, the composite also may be lighter in weight than the matrix metal per se. Aluminum matrix composites reinforced with ceramics such as silicon carbide in particulate, platelet, or whisker form, for example, are of interest because of their higher stiffness, wear resistance and high temperature strength relative to aluminum.

Various metallurgical processes have been described for the fabrication of aluminum matrix composites, including methods based on powder metallurgy techniques and liquid-metal infiltration techniques which make use of pressure casting, vacuum casting, stirring, and wetting agents.

With powder metallurgy techniques, the metal in the form of a powder and the reinforcing material in the form of a powder, whiskers, chopped fibers, etc., are admixed and then either cold-pressed and sintered, or hot-pressed. The production of metal matrix composites by powder metallurgy techniques utilizing conventional processes imposes certain limitations with respect to the characteristics of the products attainable. The volume fraction of the ceramic phase in the composite is limited, in the case of particulates, typically to about 40 percent. Also, the pressing operation poses a limit on the practical size attainable. Only relatively simple product shapes are possible without subsequent processing (e.g., forming or machining) or without resorting to complex presses. Also, nonuniform shrinkage during sintering can occur, as well as nonuniformity of microstructure due to segregation in the compacts and grain growth.

U.S. Pat. No. 3,970,136 granted Jul. 20, 1976 to J. C. Cannell et al., describes a process for forming a metal matrix composite incorporating a fibrous reinforcement, e.g. silicon carbide or alumina whiskers, having a predetermined pattern of fiber orientation. The composite is made by placing parallel mats or felts of coplanar fibers in a mold with a reservoir of molten matrix metal, e.g., aluminum, between at least some of the mats, and applying pressure to force molten metal to penetrate the mats and surround the oriented fibers. Molten metal may be poured onto the stack of mats while being forced under pressure to flow between the mats. Loadings of up to about 50% by volume of reinforcing fibers in the composite have been reported.

The above-described infiltration process, in view of its dependence on outside pressure to force the molten matrix metal through the stack of fibrous mats, is subject to the vagaries of pressure-induced flow processes, i.e., possible non-uniformity of matrix formation, porosity, etc. Non-uniformity of properties is possible even though molten metal may be introduced at a multiplicity of sites within the fibrous array. Consequently, complicated mat/reservoir arrays and flow pathways need to be provided to achieve adequate and uniform penetration of the stack of fiber mats. Also, the aforesaid pressure-infiltration method allows for only a relatively low reinforcement to matrix volume fraction to be achieved because of the difficulty inherent in infiltrating a large mat volume. Still further, molds are required to contain the molten metal under pressure, which adds to the expense of the process. Finally, the aforesaid process, limited to infiltrating aligned particles or fibers, is not directed to formation of metal matrix composites reinforced with materials in the form of randomly oriented particles, whiskers or fibers.

In the fabrication of aluminum matrix-alumina filled composites, aluminum does not readily wet alumina, thereby making it difficult to form a coherent product. Other matrix metal-filler combinations are subject to the same considerations. Various solutions to this problem have been suggested. One such approach is to coat the alumina with a metal (e.g., nickel or tungsten), which is then hot-pressed along with the aluminum. In another technique, the aluminum is alloyed with lithium, and the alumina may be coated with silica. However, these composites exhibit variations in properties, or the coatings can degrade the filler, or the matrix contains lithium which can affect the matrix properties.

U.S. Pat. No. 4,232,091 to R. W. Grimshaw et al. overcomes certain difficulties in the art which are encountered in the production of aluminum matrix-alumina composites. This patent describes applying pressures of 75-375 kg/cm$^2$ to force molten aluminum (or molten aluminum alloy) into a fibrous or whisker mat of alumina which has been preheated to 700° to 1050° C. The maximum volume ratio of alumina to metal in the resulting solid casting was ¼. Because of its dependency on outside force to accomplish infiltration, this process is subject to many of the same deficiencies as that of Cannell et al.

European Patent Application Publication No. 115,742 describes making aluminum-alumina composites, especially useful as electrolytic cell components, by filling the voids of a preformed alumina matrix with molten aluminum. The application emphasizes the nonwettability of alumina by aluminum, and therefore various techniques are employed to wet the alumina throughout the preform. For example, the alumina is coated with a wetting agent of a diboride of titanium, zirconium, hafnium, or niobium, or with a metal, i.e., lithium, magnesium, calcium, titanium, chromium, iron, cobalt, nickel, zirconium, or hafnium. Inert atmospheres, such as argon, are employed to facilitate wetting. This reference also shows applying pressure to cause molten aluminum to penetrate an uncoated matrix. In this aspect, infiltration is accomplished by evacuating the pores and then applying pressure to the molten aluminum in an inert atmosphere, e.g., argon. Alternatively, the preform can be infiltrated by vapor-phase aluminum deposition to set the surface prior to filling the voids by infiltration with molten aluminum. To assure retention of the aluminum in the pores of the preform, heat treatment, e.g., at 1400° to 1800° C., in either a vacuum or in argon is required. Otherwise, either exposure of the pressure infiltrated material to gas or removal of the infiltration pressure will cause loss of aluminum from the body.

The use of wetting agents to effect infiltration of an alumina component in an electrolytic cell with molten metal is also shown in European Patent Application Publication No. 94353. This publication describes production of aluminum by electrowinning with a cell having a cathodic current feeder as a cell liner or substrate. In order to protect this substrate from molten cryolite, a thin coating of a mixture of a wetting agent and solubility suppressor is applied to the alumina substrate prior to start-up of the cell or while immersed in the molten aluminum produced by the electrolytic process. Wetting agents disclosed are titanium, zirconium, hafnium, silicon, magnesium, vanadium, chromium, niobium, or calcium, and titanium is stated as the preferred agent. Compounds of boron, carbon and nitrogen are described as being useful in suppressing the solubility of the wetting agents in molten aluminum. The reference, however, does not suggest the production of metal matrix composites.

In addition to application of pressure and wetting agents, it has been disclosed that an applied vacuum will aid the penetration of molten aluminum into a porous ceramic compact. For example, U.S. Pat. No. 3,718,441 granted Feb. 27, 1973 to R. L. Landingham reports infiltration of a ceramic compact (e.g., boron carbide, alumina and beryllia) with either molten aluminum, beryllium, magnesium, titanium, vanadium, nickel or chromium under a vacuum of less than $10^{-6}$ torr. A vacuum of $10^{-2}$ to $10^{-6}$ torr resulted in poor wetting of the ceramic by the molten metal to the extent that the metal did not flow freely into the ceramic void spaces. However, wetting was said to have improved when the vacuum was reduced to less than $10^{-6}$ torr.

U.S. Pat. No. 3,864,154 granted Feb. 4, 1975 to G. E. Gazza et al. also shows the use of vacuum to achieve infiltration. The patent describes loading a cold-pressed compact of $AlB_{12}$ powder onto a bed of cold-pressed aluminum powder. Additional aluminum was then positioned on top of the $AlB_{12}$ powder compact. The crucible, loaded with the $AlB_{12}$ compact "sandwiched" between the layers of aluminum powder, was placed in a vacuum furnace. The furnace was evacuated to approximately $10^{-5}$ torr to permit outgassing. The temperature was subsequently raised to 1100° C. and maintained for a period of 3 hours. At these conditions, the molten aluminum penetrated the porous $AlB_{12}$ compact.

A method for making composite materials containing a reinforcing material such as fibers, wires, powder, whiskers or the like is disclosed in European Patent Application Publication No. 045,002, published on Feb. 3, 1982 in the name of Donomoto. A composite material is produced by placing a porous reinforcing material (e.g., aligned fibers of alumina, carbon, or boron) that is non-reactive with the atmosphere and a molten metal (e.g., magnesium or aluminum) into a container having an open portion, blowing substantially pure oxygen into the container, then immersing the container in a pool of the molten metal whereby the molten metal infiltrates the interstices of the reinforcing material. The publication discloses that the molten metal reacts with the oxygen present in the container to form a solid oxidized form of the metal, creating a vacuum in the container which draws molten metal through the interstices of the reinforcing material and into the container. In an alternative embodiment, the publication discloses placing an oxygen getter element (e.g., magnesium) within the container to react with the oxygen in the container to create a vacuum which, with the assistance of 50 kg/cm² argon pressurization of the molten metal, draws the molten metal (e.g., aluminum) into the container filled with reinforcing material (e.g., aligned carbon fibers).

U.S. Pat. No. 3,867,177 granted Feb. 18, 1975 to J. J. Ott et al. discloses a method for impregnating a porous body with a metal by first contacting the body with an "activator metal", then immersing the body in a "filler metal" Specifically, a porous mat or compacted body of filler material is immersed in a molten activator metal for a time sufficient to completely fill the interstices of the body with molten activator metal by the method of the Reding et al U.S. Pat. No. 3,364,976, discussed below. Subsequently, upon solidification of the activator metal, the composite body is entirely immersed in a second metal and maintained for a time sufficient to allow the second metal to replace the activator metal to a desired extent. The formed body is then allowed to cool. It is also possible to at least partially remove the filler metal from within the porous body and replace it with at least a third metal, again by partially or totally immersing the porous body in a molten replacement metal for a sufficient time to dissolve or diffuse a desired amount of replacement metal into the porous body. The resultant body may also contain intermetallics of the metals in the interstices between the filler material. Utilizing a multiple step process, including the use of an activator metal to form a composite having a desired composition, is costly in both time and money. Further, the limitations on processing based on, e.g., compatibility of metals (i.e., solubility, melting point, reactivity, etc.), limit the ability to tailor the characteristics of the material for a desired purpose.

U.S. Pat. No. 3,529,655 granted Sep. 22, 1970 to G. D. Lawrence, discloses a process for forming composites of magnesium or magnesium alloys and silicon carbide whiskers. Specifically, a mold having at least one opening to the atmosphere and containing silicon carbide whiskers in the interior volume of the mold is immersed in a bath of molten magnesium so that all openings in the mold are below the surface of the molten magnesium for a time sufficient for the magnesium to fill the remaining volume of the mold cavity. It is said that as the molten metal enters the mold cavity it reacts with the air contained therein to form small amounts of magnesium oxide and magnesium nitride, thereby forming a vacuum which draws additional molten metal into the cavity and between the whiskers of silicon carbide. The filled mold is subsequently removed from the molten magnesium bath and the magnesium in the mold is allowed to solidify.

U.S. Pat. No. 3,364,976 granted Jan. 23, 1968 to John N. Reding et al. discloses creating a self-generated vacuum in a body to enhance penetration of a molten metal into the body. Specifically, a body, e.g., a graphite or steel mold, or a porous refractory material, is entirely submerged in a molten metal, e.g., magnesium, magnesium alloy or aluminum alloy. In the case of a mold, the mold cavity, which is filled with a gas, e.g., air, that is reactive with the molten metal, communicates with the externally located molten metal through at least one orifice in the mold. When the mold is submerged in the melt, filling of the cavity occurs as a vacuum is produced from the reaction between the gas in the cavity and the molten metal. Particularly, the vacuum is a result of the formation of a solid oxidized form of the metal.

U.S. Pat. No. 3,396,777 granted Aug. 13, 1968 to John N. Reding, Jr., discloses creating a self-generated vacuum to enhance penetration of a molten metal into a body of filler material. Specifically, the patent discloses a steel or iron container open to the atmosphere at one end, the container containing a particulate porous solid, e.g., coke or iron, and being covered at the open end with a lid having perforations or throughholes smaller in diameter than the particle size of the porous solid filler. The container also houses an atmosphere, e.g., air, within the porosity of the solid filler which is at least partially reactive with the molten metal, e.g., magnesium, aluminum, etc. The lid of the container is immersed a sufficient distance below the surface of the molten metal to prevent air from entering the container and the lid is held below the surface for a sufficient time for the atmosphere in the container to react with the molten metal to form a solid product. The reaction between the atmosphere and the molten metal results in a low pressure or substantial vacuum within the container and porous solid that draws the molten metal into the container and the pores of the porous solid.

The Reding, Jr., process is somewhat related to the processes disclosed by European Publication No. 045,002, and U.S. Pat. Nos., 3,867,177, 3,529,655, and 3,364,976, all of which were discussed above herein. Specifically, this Reding, Jr., Patent provides a bath of molten metal into which a container, containing a filler material therein, is immersed deeply enough to induce a reaction between gas in the cavity and the molten metal and to seal the cavity with the molten metal. In another aspect of this Patent, the surface of the molten bath of matrix metal, which may be subject to oxidation in the molten state when in contact with the ambient air, is covered with a protective layer or flux. The flux is swept aside when the container is introduced to the molten metal, but contaminants from the flux may nevertheless be incorporated into the bath of molten matrix metal and/or into the container and porous solid material to be infiltrated. Such contamination, even at very low levels, may be detrimental to the formation of the vacuum in the container, as well as to the physical properties of the resultant composite. Further, when the container is removed from the bath of molten matrix metal and excess matrix metal is drained from the container, loss of matrix metal from the infiltrated body can occur due to gravitational forces.

Accordingly, there has been a long felt need for a simple and reliable process for producing metal matrix composites that does not rely upon the use of externally applied pressure or vacuum damaging wetting agents or the use of a pool of molten matrix metal, with their attendant disadvantages as noted above. In addition, there has been a long felt need for a process that minimizes the final machining operations needed to produce a metal matrix composite body. The present invention satisfies these and other needs by providing a process involving a self-generated vacuum for infiltrating a material (e.g., a ceramic material), which can be formed into a preform, with a molten matrix metal (e.g., aluminum, magnesium, bronze, copper, cast iron, etc.) in the presence of a reactive atmosphere (e.g., air, nitrogen, oxygen, etc.) under normal atmospheric pressures.

DISCUSSION OF RELATED COMMONLY-OWNED PATENTS AND PATENT APPLICATIONS

A novel method of forming a metal matrix composite by infiltration of a permeable mass of filler contained in a ceramic matrix composite mold is disclosed in Commonly Owned U.S. Pat. No. 4,871,008, which issued on Oct. 3, 1989, from U.S. patent application Ser. No. 142,385, filed Jan. 11, 1988, by Dwivedi et al., and entitled "Method of Making Metal Matrix Composites". According to the method of the Dwivedi et al. invention, a mold is formed by the directed oxidation of a molten precursor metal or parent metal with an oxidant to develop or grow a polycrystalline oxidation reaction product which embeds at least a portion of a preform comprised of a suitable filler (referred to as a "first filler"). The formed mold of ceramic matrix composite is then provided with a second filler and the second filler and mold are contacted with molten metal, and the mold contents are hermetically sealed, most typically by introducing at least one molten metal into the entry or opening which seals the mold. The hermetically sealed bedding may contain entrapped air, but the entrapped air and the mold contents are isolated or sealed so as to exclude or shut-out the external or ambient air. By providing a hermetic environment, effective infiltration of the second filler at moderate molten metal temperatures is achieved, and therefore obviates or eliminates any necessity for wetting agents, special alloying ingredients in the molten matrix metal, applied mechanical pressure, applied vacuum, special gas atmospheres or other infiltration expedients.

The method of Dwivedi et al., was improved upon by Kantner et al., in commonly owned and copending U.S. patent application Ser. No. 07/381,523, filed Jul. 18, 1989, and entitled "A Method of Forming Metal Matrix Composite Bodies By A Self-Generated Vacuum Process, and Products Produced Therefrom" According to the method of Kantner et al., an impermeable container is fabricated and a filler material or preform is placed inside the container. A matrix metal is then made molten and placed into contact with the filler material or preform. A sealing means is then formed to isolate any ambient atmosphere from the reactive atmosphere contained within the filler material or preform. A self-generated vacuum is then formed within the container which results in molten matrix metal infiltrating the filler material or preform. The matrix metal is thereafter cooled (e.g., directionally solidified) and the formed metal matrix composite body is removed from the container. Kantner et al., disclose a number of different matrix metal and filler material combinations which are suitable for use with the invention disclosed therein.

A further invention by Kantner et al., is contained in commonly owned and copending U.S. patent application Ser. No. 07/383,935, filed Jul. 21, 1989, and entitled "A Method of Forming Macrocomposite Bodies By Self-Generated Vacuum Techniques, and Products Produced Therefrom". According to the method of this Kantner et al. application, a reaction system similar to that disclosed in application Ser. No. 07/381,523 is utilized. However, in this invention, prior to infiltration, the filler material or preform is placed adjacent to, or in contact with, at least one second material such that after infiltration of the filler material or preform, the infiltrated material is bonded to at least a portion of the second material, thereby forming a macrocomposite body.

The above-discussed commonly owned patent applications and patent describe methods for the production of metal matrix composite bodies and the novel bodies (both metal matrix composite and macrocomposite bodies) which are produced therefrom. The entire disclosures of each of the commonly owned patent applications and patent are expressly incorporated herein by reference.

SUMMARY OF THE INVENTION

In the method of the present invention, a novel metal matrix composite body is produced by a novel self-generated vacuum technique, wherein a molten matrix metal infiltrates a permeable mass of filler material or preform which is disposed in an impermeable container. Specifically, a molten matrix metal and a reactive atmosphere are both in communication with the permeable mass, at least at some point during the process, and upon contact between the reactive atmosphere and the matrix metal and/or filler material or preform and/or impermeable container, a vacuum is generated, resulting in the molten matrix metal infiltrating the filler material or preform.

In a first preferred embodiment, a reaction system is provided comprising an impermeable container, and a filler material contained therein, contacting a molten matrix metal in the presence of a reactive atmosphere and a sealing means for sealing the reaction system from the ambient atmosphere. The reactive atmosphere reacts, either partially or substantially completely, with the molten matrix metal and/or the filler material and/or the impermeable container to form a reaction product which may create a vacuum, thereby drawing molten matrix metal at least partially into the filler material. The reaction involving the reactive atmosphere and molten matrix metal and/or filler material and/or impermeable container may continue for a time sufficient to allow molten matrix metal to either partially or substantially completely infiltrate the filler material or preform. An extrinsic sealing means for sealing the reaction system, having a composition different from the matrix metal, may be provided.

In another preferred embodiment, the matrix metal may react with the ambient atmosphere to form an intrinsic chemical sealing means, having a composition different from the matrix metal, which seals the reaction system from the ambient atmosphere.

In a further embodiment of the invention, rather than providing an extrinsic sealing means for sealing the reaction system, an intrinsic physical seal may be formed by the matrix metal wetting the impermeable container, thus sealing the reaction system from the ambient atmosphere. Further, it may be possible to incorporate alloying additives into the matrix metal which facilitate wetting of the impermeable container by the matrix metal, thus sealing the reaction system from the ambient atmosphere.

In another preferred embodiment, the filler material may react, at least partially, with the reactive atmosphere to create a vacuum which draws molten matrix metal into the filler material or preform. Moreover, additives may be incorporated into the filler material which may react, either partially or substantially completely, with the reactive atmosphere to create a vacuum, as well as enhance the properties of the resultant body. Furthermore, in addition to or instead of the filler material and the matrix metal, the impermeable container may at least partially react with the reactive atmosphere to generate a vacuum.

DEFINITIONS

As used in the present specification and the appended claims, the terms below are defined as follows:

"Alloy Side", as used herein, refers to that side of a metal matrix composite which initially contacted molten matrix metal before that molten metal infiltrated the permeable mass of filler material or preform.

"Aluminum", as used herein, means and includes essentially pure metal (e.g., a relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Ambient Atmosphere", as used herein, refers to the atmosphere outside the filler material or preform and the impermeable container. It may have substantially the same constituents as the reactive atmosphere, or it may have different constituents.

"Barrier" or "barrier means", as used herein, in conjunction with metal matrix composite bodies, means any suitable means which interferes, inhibits, prevents or terminates the migration, movement, or the like, of molten matrix metal beyond a surface boundary of a permeable mass of filler material or preform, where such surface boundary is defined by said barrier means. Suitable barrier means may be any such material, compound, element, composition, or the like, which, under the process conditions, maintains some integrity and is not substantially volatile (i.e., the barrier material does not volatilize to such an extent that it is rendered nonfunctional as a barrier).

Further, suitable "barrier means" includes materials which are either wettable or non-wettable by the migrating molten matrix metal under the process conditions employed, so long as wetting of the barrier means does not proceed substantially beyond the surface of the barrier material (i.e., surface wetting). A barrier of this type appears to exhibit substantially little or no affinity for the molten matrix metal, and movement beyond the defined surface boundary of the mass of filler material or preform is prevented or inhibited by the barrier means. The barrier reduces any final machining or grinding that may be required and defines at least a portion of the surface of the resulting metal matrix composite product.

"Bronze", as used herein, means and includes a copper rich alloy, which may include iron, tin, zinc, aluminum, silicon, beryllium, magnesium and/or lead. Specific bronze alloys include those alloys in which the proportion of copper is about 90% by weight, the proportion of silicon is about 6% by weight, and the proportion of iron is about 3% by weight.

"Carcass" or "Carcass of Matrix Metal", as used herein, refers to any of the original body of matrix metal remaining which has not been consumed during formation of the metal matrix composite body, and typically, if allowed to cool, remains in at least partial contact with the metal matrix composite body which has been formed. It should be understood that the carcass may also include a second or foreign metal therein.

"Cast Iron", as used herein, refers to the family of cast ferrous alloys wherein the proportion of carbon is at least about 2% by weight.

"Copper", as used herein, refers to the commercial grades of the substantially pure metal, e.g., 99% by weight copper with varying amounts of impurities contained therein. Moreover, it also refers to metals which are alloys or intermetallics which do not fall within the definition of bronze, and which contain copper as the major constituent therein.

"Filler", as used herein, is intended to include either single constituents or mixtures of constituents which are substantially non-reactive with and/or of limited solubility in the matrix metal and may be single or multiphase. Fillers may be provided in a wide variety of forms, such as powders, flakes, platelets, microspheres, whiskers, bubbles, etc., and may be packed either dense or porous. "Filler" may also include ceramic fillers, such as alumina or silicon carbide as fibers, chopped fibers, particulates, whiskers, bubbles, spheres, fiber mats, or the like, and ceramic-coated fillers such as carbon fibers coated with alumina or silicon carbide to protect the carbon from attack, for example, by a molten aluminum matrix metal. Fillers may also include metals.

"Impermeable Container", as used herein, means a container which may house or contain a reactive atmosphere and a filler material (or preform) and/or molten matrix metal and/or a sealing means under the process conditions, and which is sufficiently impermeable to the transport of gaseous or vapor species through the container, such that a pressure difference between the ambient atmosphere and the reactive atmosphere can be established.

"Matrix Metal" or "Matrix Metal Alloy", as used herein, means that metal which is utilized to form a metal matrix composite (e.g., before infiltration) and/or that metal which is intermingled with a filler material to form a metal matrix composite body (e.g., after infiltration). When a specified metal is mentioned as the matrix metal, it should be understood that such matrix metal includes that metal as an essentially pure metal, a commercially available metal having impurities and/or alloying constituents therein, an intermetallic compound or an alloy in which that metal is the major or predominant constituent.

"Metal Matrix Composite" or "MMC", as used herein, means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different" from the Matrix Metal means a metal which does not contain, as a primary constituent, the same metal as the matrix metal (e.g., if the primary constituent of the matrix metal is aluminum, the "different" metal could have a primary constituent of, for example, nickel).

"Preform" or "Permeable Preform", as used herein, means a porous mass of filler or filler material which is manufactured with at least one surface boundary which essentially defines a boundary for infiltrating matrix metal, such mass retaining sufficient shape integrity and green strength to provide dimensional fidelity without any external means of support prior to being infiltrated by the matrix metal. The mass should be sufficiently porous to permit infiltration of the matrix metal. A preform typically comprises a bonded array or arrangement of filler, either homogeneous or heterogeneous, and may be comprised of any suitable material (e.g., ceramic and/or metal particulates, powders, fibers, whiskers, etc., and any combination thereof). A preform may exist either singularly or as an assemblage.

"Reaction System", as used herein, refers to that combination of materials which exhibit self-generated vacuum infiltration of a molten matrix metal into a filler material or preform. A reaction system comprises at least an impermeable container having therein a permeable mass of filler material or preform, a reactive atmosphere and a matrix metal.

"Reactive Atmosphere", as used herein, means an atmosphere which may react with the matrix metal and/or filler material (or preform) and/or impermeable container to form a self-generated vacuum, thereby causing molten matrix metal to infiltrate into the filler material (or preform) upon formation of the self-generated vacuum.

"Reservoir", as used herein, means a separate body of matrix metal positioned relative to a mass of filler or a preform so that, when the metal is molten, it may flow to replenish, or in some cases to initially provide and subsequently replenish, that portion, segment or source of matrix metal which is in contact with the filler or preform.

"Seal" or "Sealing Means", as used herein, refers to a gas-impermeable seal under the process conditions, whether formed independent of (e.g., an extrinsic seal) or formed by the reaction system (e.g., an intrinsic seal), which isolates the ambient atmosphere from the reactive atmosphere. The seal or sealing means may have a composition different from that of the matrix metal.

"Seal Facilitator", as used herein, is a material that facilitates formation of a seal upon reaction of the matrix metal with the ambient atmosphere and/or the impermeable container and/or the filler material or preform. The material may be added to the matrix metal, and the presence of the seal facilitator in the matrix metal may enhance the properties of the resultant composite body.

"Wetting Enhancer", as used herein, refers to any material, which when added to the matrix metal and/or the filler material or preform, enhances the wetting (e.g., reduces surface tension of molten matrix metal) of the filler material or preform by the molten matrix metal. The presence of the wetting enhancer may also enhance the properties of the resultant metal matrix composite body by, for example, enhancing bonding between the matrix metal and the filler material.

BRIEF DESCRIPTION OF THE FIGURES

The following figures are provided to assist in understanding the invention, but are not intended to limit the scope of the invention. Similar reference numerals have been used wherever possible in each of the Figures to denote like components, wherein:

FIG. 14 is a schematic cross-sectional view of a typical split mold lay-up according to the method of the present invention utilized to make net shaped metal matrix composite bodies;

DETAILED DESCRIPTION OF THE INVENTION AND PREFERRED EMBODIMENTS

Figure 1:
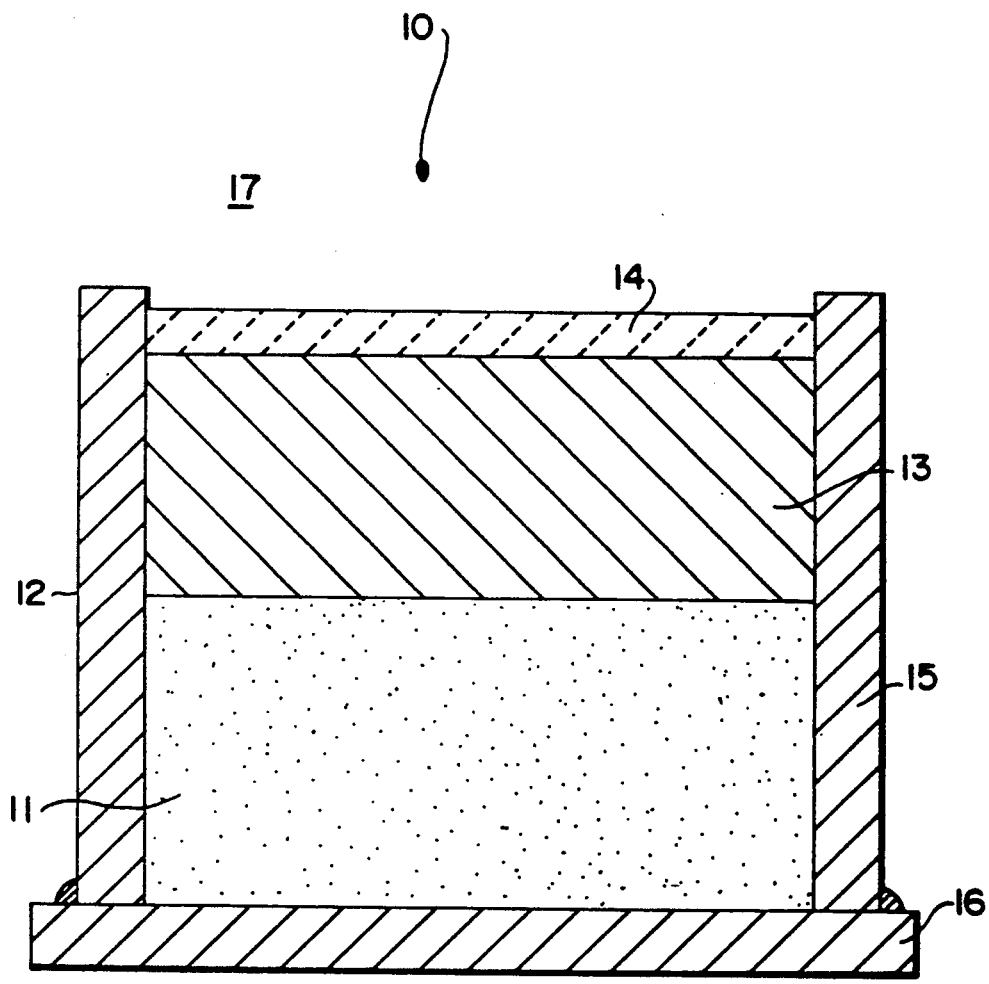
FIG. 1 is a schematic cross-sectional view of a typical lay-up according to the method of the present invention utilizing an extrinsic sealing means.

With reference to FIG. 1, a typical lay-up 10 for forming a metal matrix composite by a self-generated vacuum technique according to the present invention is illustrated. Specifically, a filler material or preform 11, which may be of any suitable material as discussed in more detail below, is disposed in an impermeable container 12 which is capable of housing a molten matrix metal 13 and a reactive atmosphere. For example, the filler material 11 may be contacted with a reactive atmosphere (e.g., that atmosphere which exists within the porosity of the filler material or preform) for a time sufficient to allow the reactive atmosphere to permeate either partially or substantially completely the filler material 11 in the impermeable container 12. The matrix metal 13, in either a molten form or a solid ingot form, is then placed in contact with the filler material 11. As descried in more detail below in a preferred embodiment, an extrinsic seal or sealing means 14 may be provided, for example, on the surface of the matrix metal 13, to isolate the reactive atmosphere from the ambient atmosphere 17. The sealing means 14, whether extrinsic or intrinsic, may or may not function as a sealing means at room temperature, but should function as a sealing means under the process conditions (e.g., at or above the melting point of the matrix metal). The lay-up 10 is subsequently placed into a furnace, which is either at room temperature or has been preheated to about the process temperature. Under the process conditions, the furnace operates at a temperature above the melting point of the matrix metal to permit infiltration of molten matrix metal into the filler material or preform by the formation of a self-generated vacuum.

Figure 2:
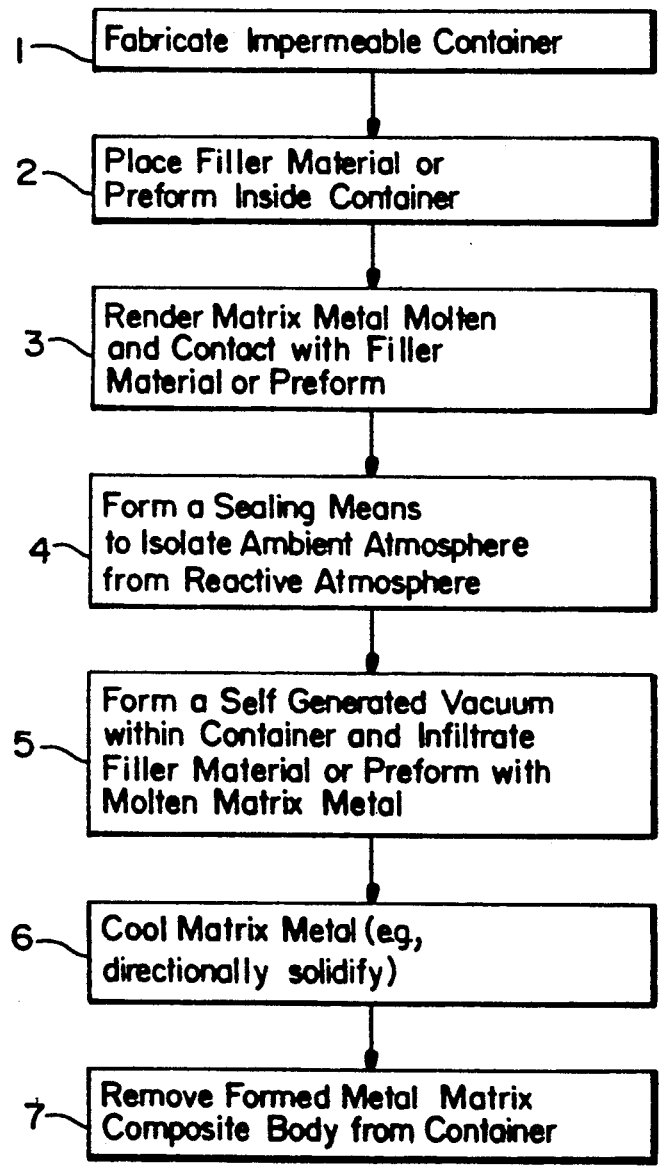
FIG. 2 is a simplified flow chart of the method of the present invention applied to a standard lay-up.

Referring to FIG. 2, there is shown a simplified flowchart of process steps for carrying out the method of the present invention. In step 1, a suitable impermeable container can be fabricated or otherwise obtained that has the appropriate properties described in more detail below. For example, a simple open-topped steel (e.g., stainless steel) cylinder is suitable as a mold. The steel container may then optionally be lined with graphite foil (e.g., GRAFOIL® Union Carbide) to facilitate removal of the metal matrix composite body which is to be formed in the container. As described in more detail below, other materials, such as $B_2O_3$ dusted inside the container, or tin which is added to the matrix metal, can also be used to facilitate release of the metal matrix composite body from the container or mold. The container can then be loaded with a desired quantity of a suitable filler material or preform which, optionally, can be at least partially covered with another layer of graphite foil. That layer of graphite foil facilitates separation of the metal matrix composite body from any carcass of matrix metal remaining after infiltration of the filler material.

A quantity of molten matrix metal, e.g., aluminum, bronze, copper, cast iron, magnesium, etc., can then be poured into the container. The container could be at room temperature or it could be preheated to any suitable temperature. Moreover, matrix metal could initially be provided as solid ingots of matrix metal and thereafter heated to render the ingots molten. An appropriate sealing means (described below in greater detail) selected from the group consisting of an extrinsic sealing means and an intrinsic sealing means can then be formed. For example, if it was desired to form an extrinsic seal, an extrinsic sealing means, such as a glass (e.g., $B_2O_3$) frit, can be applied to the surface of the pool of molten matrix metal in the container. The frit then melts, typically covering the surface of the pool, but, as described in more detail below, full coverage is not required. After contacting molten matrix metal with a filler material or preform and sealing the matrix metal and/or filler material from the ambient atmosphere by an extrinsic sealing means, if needed, the container is set in a suitable furnace, which may be preheated to the processing temperature, for a suitable amount of time to permit infiltration to occur. The processing temperature of the furnace may be different for different matrix metals (for example, about 950° C. for some aluminum alloys and about 1100° C. for some bronze alloys are desirable). The appropriate processing temperature will vary depending on the melting point and other characteristics of the matrix metal, as well as specific characteristics of components in the reaction system and the sealing means. After a suitable amount of time at temperature in the furnace, a vacuum will be created (described below in greater detail) within the filler material or preform, thereby permitting molten matrix metal to infiltrate the filler material or preform. The container can then be removed from the furnace and cooled, for example, by placing it on a chill plate to directionally solidify the matrix metal. The metal matrix composite can then be removed in any convenient manner from the container and separated from the carcass of matrix metal, if any.

It will be appreciated that the foregoing descriptions of FIGS. 1 and 2 are simple to highlight salient features of the present invention. Further details of the steps in the process and of the characteristics of the materials which can be used in the process are set forth below.

Without wishing to be bound by any particular theory or explanation, it is believed that when a suitable matrix metal, typically in a molten state, contacts a suitable filler material or preform in the presence of a suitable reactive atmosphere in an impermeable container, a reaction may occur between the reactive atmosphere and the molten matrix metal and/or filler material or preform and/or impermeable container that results in a reaction product (e.g., a solid, liquid or vapor) which occupies a lesser volume than the initial volume occupied by the reacting components. When the reactive atmosphere is isolated from the ambient atmosphere, a vacuum may be created in the permeable filler material or preform which draws molten matrix metal into the void spaces of the filler material. Continued reaction between the reactive atmosphere and the molten matrix metal and/or filler material or preform and/or impermeable container may result in the matrix metal infiltrating the filler material or preform as additional vacuum is generated. The reaction may be continued for a time sufficient to permit molten matrix metal to infiltrate, either partially or substantially completely, the mass of filler material or preform. The filler material or preform should be sufficiently permeable to allow the reactive atmosphere to permeate, at least partially, the mass of filler material or preform.

This application discusses various matrix metals which at some point during the formation of a metal matrix composite are contacted with a reactive atmosphere. Thus various references will be made to particular matrix metal/reactive atmosphere combinations or systems which exhibit self-generated vacuum formation. Specifically, self-generated vacuum behavior has been observed in the aluminum/air system; the aluminum/oxygen system; the aluminum/nitrogen system; the bronze/air system; the bronze/nitrogen system; the copper/air system; the copper/nitrogen system and the cast iron/air system. However, it will be understood that matrix metal/reactive atmosphere systems other than those specifically discussed in this application may behave in a similar manner.

In order to practice the self-generated vacuum technique of the present invention, it is necessary for the reactive atmosphere to be physically isolated from the ambient atmosphere such that the reduced pressure of the reactive atmosphere which exists during infiltration will not be significantly adversely affected by any gas being transported from the ambient atmosphere. An impermeable container that can be utilized in the method of the present invention may be a container of any size, shape and/or composition which may or may not be non-reactive with the matrix metal and/or reactive atmosphere and that is impermeable to the ambient atmosphere under the process conditions. Specifically, the impermeable container may comprise any material (e.g., ceramic, metal, glass, polymer, etc.) which can survive the process conditions such that it maintains its size and shape and which prevents or sufficiently inhibits transport of the ambient atmosphere through the container. By utilizing a container which is sufficiently impermeable to transport of atmosphere through the container, it is possible to form a self-generated vacuum within the container. Further, depending on the particular reaction system used, an impermeable container which is at least partially reactive with the reactive atmosphere and/or matrix metal and/or filler material may be used to create or assist in creating a self-generated vacuum within the container.

The characteristics of a suitable impermeable container are freedom from pores, cracks or reducible oxides each of which may adversely interfere with the development or maintenance of a self-generated vacuum. It will thus be appreciated that a wide variety of materials can be used to form impermeable containers. For example, molded or cast alumina or silicon carbide can be used, as well as metals having limited or low solubility in the matrix metal, e.g., stainless steel for aluminum, copper and bronze matrix metals.

In addition, otherwise unsuitable materials such as porous materials (e.g., ceramic bodies) can be rendered impermeable by formation of a suitable coating on at least a portion thereof. Such impermeable coatings may be any of a wide variety of glazes and gels suitable for bonding to and sealing such porous materials. Furthermore, a suitable impermeable coating may be liquid at process temperatures, in which case the coating material should be sufficiently stable to remain impermeable under the self-generated vacuum, for example, by viscously adhering to the container or the filler material or preform. Suitable coating materials include glassy materials (e.g., $B_2O_3$) chlorides, carbonates, etc., provided that the pore-size of the filler or preform is small enough that the coating can effectively block the pores to form an impermeable coating.

The matrix metal used in the method of the present invention may be any matrix metal which, when molten under the process conditions, infiltrates the filler material or preform upon the creation of a vacuum within the filler material. For example, the matrix metal may be any metal, or constituent within the metal, which reacts with the reactive atmosphere under the process conditions, either partially or substantially completely, thereby causing the molten matrix metal to infiltrate the filler material or preform due to, at least in part, the creation of a vacuum therein. Further, depending on the system utilized, the matrix metal may be either partially or substantially non-reactive with the reactive atmosphere, and a vacuum may be created due to a reaction of the reactive atmosphere with, optionally, one or more other components of the reaction system, thereby permitting the matrix metal to infiltrate the filler material.

In a preferred embodiment, the matrix metal may be alloyed with a wetting enhancer to facilitate the wetting capability of the matrix metal, thus, for example, facilitating the formation of a bond between the matrix metal and the filler, reducing porosity in the formed metal matrix composite, reducing the amount of time necessary for complete infiltration, etc. Moreover, a material which comprises a wetting enhancer may also act as a seal facilitator, as described below, to assist in isolating the reactive atmosphere from the ambient atmosphere. Still further, in another preferred embodiment, wetting enhancer may be incorporated directly into the filler material rather than being alloyed with the matrix metal.

Thus, wetting of the filler material by the matrix metal may enhance the properties (e.g., tensile strength, erosion resistance, etc.) of the resultant composite body. Further, wetting of the filler material by molten matrix metal may permit a uniform dispersion of filler throughout the formed metal matrix composite and improve bonding of the filler to the matrix metal. Useful wetting enhancers for an aluminum matrix metal include magnesium, bismuth, lead, tin, etc., and for bronze and copper include selenium, tellurium, sulfur, etc. Moreover, as discussed above, at least one wetting enhancer may be added to the matrix metal and/or filler material to impart desired properties to the resultant metal matrix composite body.

Moreover, it is possible to use a reservoir of matrix metal to ensure complete infiltration of matrix metal into the filler material and/or to supply a second metal which has a different composition from the first source of matrix metal. Specifically, in some cases it may be desirable to utilize a matrix metal in the reservoir which differs in composition from the first source of matrix metal. For example, if an aluminum alloy is used as the first source of matrix metal, then virtually any other metal or metal alloy which is molten at the processing temperature could be used as the reservoir metal. Molten metals frequently are very miscible with each other which would result in the reservoir metal mixing with the first source of matrix metal, so long as an adequate amount of time is given for the mixing to occur. Thus, by using a reservoir metal which is different in composition from the first source of matrix metal, it is possible to tailor the properties of the matrix metal to meet various operating requirements and thus tailor the properties of the metal matrix composite body.

The temperature to which the reaction system is exposed (e.g., processing temperature) may vary depending upon which matrix metals, filler materials or preforms, and reactive atmospheres are used. For example, for an aluminum matrix metal, the present self-generated vacuum process generally proceeds at a temperature of at least about 700° C. and preferably about 850° C. or more. Temperatures in excess of 1000° C. are generally not necessary, and a particularly useful range is 850° C. to 1000° C. For a bronze or copper matrix metal, temperatures of about 1050° C. to about 1125° C. are useful, and for cast iron, temperatures of about 1250° C. to about 1400° C. are suitable. Generally, temperatures which are above the melting point but below the volatilization point of the matrix metal may be used.

It is possible to tailor the composition and/or microstructure of the metal matrix during formation of the composite to impart desired characteristics to the resulting product. For example, for a given system, the process conditions may be selected to control the formation of, e.g., intermetallics, oxides, nitrides, etc. Further, in addition to tailoring the composition of the composite body, other physical characteristics, e.g., porosity, may be modified by controlling the cooling rate of the metal matrix composite body. In some cases, it may be desirable for the metal matrix composite to be directionally solidified by placing, for example, the container holding the formed metal matrix composite onto a chill plate and/or selectively placing insulating materials about the container. Further, additional properties (e.g., tensile strength) of the formed metal matrix composite may be controlled by using a heat treatment (e.g., a standard heat treatment which corresponds substantially to a heat treatment for the matrix metal alone, or one which has been modified partially or significantly).

Under the conditions employed in the method of the present invention, the mass of filler material or preform should be sufficiently permeable to allow the reactive atmosphere to penetrate or permeate the filler material or preform at some point during the process prior to isolation of the ambient atmosphere from the reactive atmosphere. In the Examples below, a sufficient amount of reactive atmosphere was contained within loosely packed particles having particle sizes ranging from about 54 to about 220 grit. By providing such a filler material, the reactive atmosphere may, either partially or substantially completely, react upon contact with the molten matrix metal and/or filler material and/or impermeable container, thereby resulting in the creation of a vacuum which draws molten matrix metal into the filler material. Moreover, the distribution of reactive atmosphere within the filler material does not have to be substantially uniform, however, a substantially uniform distribution of reactive atmosphere may assist in the formation of a desirable metal matrix composite body.

The inventive method of forming a metal matrix composite body is applicable to a wide variety of filler materials, and the choice of materials will depend largely on such factors as the matrix metal, the processing conditions, the reactivity of molten matrix metal with the reactive atmosphere, the reactivity of the filler material with the reactive atmosphere, the reactivity of molten matrix metal with the impermeable container and the properties sought for the final composite product. For example, when the matrix metal comprises aluminum, suitable filler materials include (a) oxides (e.g., alumina); (b) carbides (e.g., silicon carbide); (c) nitrides (e.g., titanium nitride); and (d) borides (e.g., titanium diboride). If there is a tendency for the filler material to react adversely with the molten matrix metal, such reaction might be accommodated by minimizing the infiltration time and temperature or by providing a non-reactive coating on the filler. The filler material may comprise a substrate, such as carbon or other non-ceramic material, bearing a ceramic coating to protect the substrate from attack or degradation. Suitable ceramic coatings include oxides, carbides, nitrides, and borides. Ceramics which are preferred for use in the present method include alumina and silicon carbide in the form of particles, platelets, whiskers and fibers. The fibers can be discontinuous (in chopped form) or in the form of continuous filaments, such as multifilament tows. Further, the composition and/or shape of the filler material or preform may be homogeneous or heterogeneous.

The size and shape of the filler material can be any that may be required to achieve the properties desired in the composite. Thus, the material may be in the form of particles, whiskers, platelets or fibers since infiltration is not restricted by the shape of the filler material. Other shapes such as spheres, tubules, pellets, refractory fiber cloth, and the like may be employed. In addition, the size of the material does not limit infiltration, although a higher temperature or longer time period may be required to obtain complete infiltration of a mass of smaller particles than for larger particles. Average filler material sizes ranging from less than 24 grit to about 500 grit are preferred for most technical applications. Moreover, by controlling the size (e.g., particle diameter, etc.) of the permeable mass of filler material or preform, the physical and/or mechanical properties of the formed metal matrix composite may be tailored to meet an unlimited number of industrial applications. Still further, by incorporating a filler material comprising varying particle sizes of filler material, higher packing of the filler material may be achieved to tailor the composite body. Also, it is possible to obtain lower particle loadings, if desired, by agitating the filler material (e.g., shaking the container) during infiltration and/or by mixing powdered matrix metal with the filler material prior to infiltration.

The reactive atmosphere utilized in the method of the present invention may be any atmosphere which may react, at least partially or substantially completely, with the molten matrix metal and/or the filler material and/or the impermeable container, to form a reaction product which occupies a volume which is smaller than that volume occupied by the atmosphere and/or reaction components prior to reaction. Specifically, the reactive atmosphere, upon contact with the molten matrix metal and/or filler material and/or impermeable container, may react with one or more components of the reaction system to form a solid, liquid or vapor-phase reaction product which occupies a smaller volume than the combined individual components, thereby creating a void or vacuum which assists in drawing molten matrix metal into the filler material or preform. Reaction between the reactive atmosphere and one or more of the matrix metal and/or filler material and/or impermeable container, may continue for a time sufficient for the matrix metal to infiltrate, at least partially or substantially completely, the filler material. For example, when air is used as the reactive atmosphere, a reaction between the matrix metal (e.g., aluminum) and air may result in the formation of reaction products (e.g., alumina and/or aluminum nitride, etc.). Under the process conditions, the reaction product(s) tend to occupy a smaller volume than the total volume occupied by the molten aluminum and the air. As a result of the reaction, a vacuum is generated, thereby causing the molten matrix metal to infiltrate the filler material or preform. Depending on the system utilized, the filler material and/or impermeable container may react with the reactive atmosphere in a similar manner to generate a vacuum, thus assisting in the infiltration of molten matrix metal into the filler material. The self-generated vacuum reaction may be continued for a time sufficient to result in the formation of a metal matrix composite body.

In addition, it has been found that a seal or sealing means, should be provided to help prevent or restrict gas flow from the ambient atmosphere into the filler material or preform (e.g., prevent flow of ambient atmosphere into the reactive atmosphere). Referring again to FIG. 1, the reactive atmosphere within the impermeable container 12 and filler material 11 should be sufficiently isolated from the ambient atmosphere 17 so that, as the reaction between the reactive atmosphere and the molten matrix metal 13 and/or the filler material or preform 11 and/or the impermeable container 12 proceeds, a pressure difference is established and maintained between the reactive and ambient atmospheres until the desired infiltration has been achieved. It will be understood that the isolation between the reactive and ambient atmospheres need not be perfect, but rather only "sufficient", so that a net pressure differential is present (e.g., there could be a vapor phase flow from the ambient atmosphere to the reactive atmosphere so long as the flow rate was lower than that needed immediately to replenish the reactive atmosphere). As described above, part of the necessary isolation of the ambient atmosphere from the reactive atmosphere is provided by the impermeability of the container 12. Since most matrix metals are also sufficiently impermeable to the ambient atmosphere, the molten matrix metal pool 13 provides another part of the necessary isolation. It is important to note, however, that the interface between the impermeable container 12 and the matrix metal may provide a leakage path between the ambient and reactive atmospheres. Accordingly, a seal should be provided that sufficiently inhibits or prevents such leakage.

Suitable seals or sealing means may be classified as mechanical, physical, or chemical, and each of those may be further classified as either extrinsic or intrinsic. By "extrinsic" it is meant that the sealing action arises independently of the molten matrix metal, or in addition to any sealing action provided by the molten matrix metal (for example, from a material added to the other elements of the reaction system); by "intrinsic" it is meant that the sealing action arises exclusively from one or more characteristics of the matrix metal (for example, from the ability of the matrix metal to wet the impermeable container). An intrinsic mechanical seal may be formed by simply providing a deep enough pool of molten matrix metal or by submerging the filler material or preform, as in the above-cited patents to Reding and Reding et al. and those patents related thereto.

Nevertheless, it has been found that intrinsic mechanical seals as taught by, for example, Reding, Jr., are ineffective in a wide variety of applications, and they may require excessively large quantities of molten matrix metal. In accordance with the present invention, it has been found that extrinsic seals and the physical and chemical classes of intrinsic seals overcome those disadvantages of an intrinsic mechanical seal. In a preferred embodiment of an extrinsic seal, a sealing means may be externally applied to the surface of the matrix metal in the form of a solid or a liquid material which, under the process conditions, may be substantially non-reactive with the matrix metal. It has been found that such an extrinsic seal prevents, or at least sufficiently inhibits, transport of vapor-phase constituents from the ambient atmosphere to the reactive atmosphere. Suitable materials for use as extrinsic physical sealing means may be either solids or liquids, including glasses (e.g., boron or silicon glasses, $B_2O_3$, molten oxides, etc.) or any other material(s) which sufficiently inhibit transport of ambient atmosphere to the reactive atmosphere under the process conditions.

An extrinsic mechanical seal may be formed by pre-smoothing or prepolishing or otherwise forming the interior surface of the impermeable container contacting the pool of matrix metal so that gas transport between the ambient atmosphere and the reactive atmosphere is sufficiently inhibited. Glazes and coatings such as $B_2O_3$ that may be applied to the container to render it impermeable can also provide suitable sealing.

An extrinsic chemical seal could be provided by placing a material on the surface of a molten matrix metal that is reactive with, for example, the impermeable container. The reaction product could comprise an intermetallic, an oxide, a carbide, etc.

In a preferred embodiment of an intrinsic physical seal, the matrix metal may react with the ambient atmosphere to form a seal or sealing means having a composition different from the composition of the matrix metal. For example, upon reaction of the matrix metal with the ambient atmosphere a reaction product (e.g., MgO and/or magnesium aluminate spinel in the case of an Al-Mg alloy reacting with air, or copper oxide in the case of a bronze alloy reacting with air) may form which may seal the reactive atmosphere from the ambient atmosphere. In a further embodiment of an intrinsic physical seal, a seal facilitator may be added to the matrix metal to facilitate the formation of a seal upon reaction between the matrix metal and the ambient atmosphere (e.g., by the addition of magnesium, bismuth, lead, etc., for aluminum matrix metals, or by the addition of selenium, tellurium, sulfur, etc., for copper or bronze matrix metals. In forming an intrinsic chemical sealing means, the matrix metal may react with the impermeable container (e.g., by partial dissolution of the container or its coating (intrinsic) or by forming a reaction product or intermetallics, etc., which may seal the filler material from the ambient atmosphere.

Further, it will be appreciated that the seal should be able to conform to volumetric (i.e., either expansion or contraction) or other changes in the reaction system without allowing ambient atmosphere to flow into the filler material (e.g., flow into the reactive atmosphere). Specifically, as molten matrix metal infiltrates into the permeable mass of filler material or preform, the depth of molten matrix metal in the container may tend to decrease. Appropriate sealing means for such a system should be sufficiently compliant to prevent gas transport from the ambient atmosphere to the filler material as the level of molten matrix metal in the container decreases.

A barrier means may also be utilized in combination with the present invention. Specifically, a barrier means which may be used in the method of this invention may be any suitable means which interferes, inhibits, prevents or terminates the migration, movement, or the like, of molten matrix metal beyond the defined surface boundary of the filler material. Suitable barrier means may be any material, compound, element, composition, or the like, which, under the process conditions of this invention, maintains some structural integrity, is not volatile and is capable of locally inhibiting, stopping, interfering with, preventing, or the like, continued infiltration or any other kind of movement beyond the defined surface boundary of the filler material. Barrier means may be used during self-generated vacuum infiltration or in any impermeable container utilized in connection with the self-generated vacuum technique for forming metal matrix composites, as discussed in greater detail below.

Suitable barrier means include materials which are either wettable or non-wettable by the migrating molten matrix metal under the process conditions employed, so long as wetting of the barrier means does not proceed substantially beyond the surface of barrier material (i.e., surface wetting). A barrier of this type appears to exhibit little or no affinity for the molten matrix alloy, and movement beyond the defined surface boundary of the filler material or preform is prevented or inhibited by the barrier means. The barrier reduces any final machining or grinding that may be required of the metal matrix composite product.

Suitable barriers particularly useful for aluminum matrix metals are those containing carbon, especially the crystalline allotropic form of carbon known as graphite. Graphite is essentially non-wettable by the molten aluminum alloy under the described process conditions. Particularly preferred graphite materials include the graphite foil products PERMA-FOIL® and GRAFOIL®, which exhibit characteristics that prevent the migration of molten aluminum alloy beyond the defined surface boundary of the filler material. These graphite foils are also resistant to heat and are substantially chemically inert. GRAFOIL® graphite foil and PERMA-FOIL® are flexible, compatible, conformable and resilient, and can be made into a variety of shapes to fit most any barrier application. Graphite barrier means may also be employed as a slurry or paste or even as a paint film around and on the boundary of the filler material or preform. GRAFOIL® graphite foil and PERMA-FOIL® are particularly preferred because they are in the form of a flexible graphite sheet. One method of using these paper-like graphite foil materials is to wrap the filler material or preform to be infiltrated within a layer of the graphite foil material. Alternatively, the graphite foil material can be formed into a negative mold of a shape which is desired for a metal matrix composite body and this negative mold can then be filled with filler material.

In addition, other finely ground particulate materials, such as 500 grit alumina, can function as a barrier, in certain situations, so long as infiltration of the particulate barrier material would occur at a rate which is slower than the rate of infiltration of the filler material.

The barrier means may be applied by any suitable means, such as by covering the defined surface boundary with a layer of the barrier means. Such a layer of barrier means may be applied by painting, dipping, silk screening, evaporating, or otherwise applying the barrier means in liquid, slurry, or paste form, or by sputtering a vaporizable barrier means, or by simply depositing a layer of a solid particulate barrier means, or by applying a solid thin sheet or film of barrier means onto the defined surface boundary. With the barrier means in place, self-generated vacuum infiltration substantially terminates when the infiltrating matrix metal reaches the defined surface boundary and contacts the barrier means.

The present method of forming a metal matrix composite by a self-generating vacuum technique in combination with the use of a barrier means provides significant advantages over the prior art. Specifically, by utilizing the method of the present invention, a metal matrix composite body may be produced without the need for expensive or complicated processing. In an aspect of the present invention, an impermeable container, which may be commercially available or tailored to a specific need, may contain a filler material or preform of a desired shape, a reactive atmosphere and a barrier means for preventing infiltration of the matrix metal beyond a desired surface. Upon contact of the reactive atmosphere with the matrix metal, which may be poured into the impermeable container and/or filler material under the processing conditions, a self-generated vacuum may be created, thereby causing the molten matrix metal to infiltrate into the filler material. The instant method avoids the need for complex processing steps, e.g., machining of molds into complex shapes, maintaining molten metal baths, removal of formed pieces from complexshaped molds, etc. Further, displacement of filler material by molten matrix metal is substantially minimized by providing a stable container which is not submerged within a molten bath of metal.

Although FIG. 1 illustrates one simple method of forming a metal matrix composite to a defined shape, i.e., the shape of the impermeable container, more complex shapes can be obtained by using molding methods and apparatus in accordance with the present invention.

Figure 3:
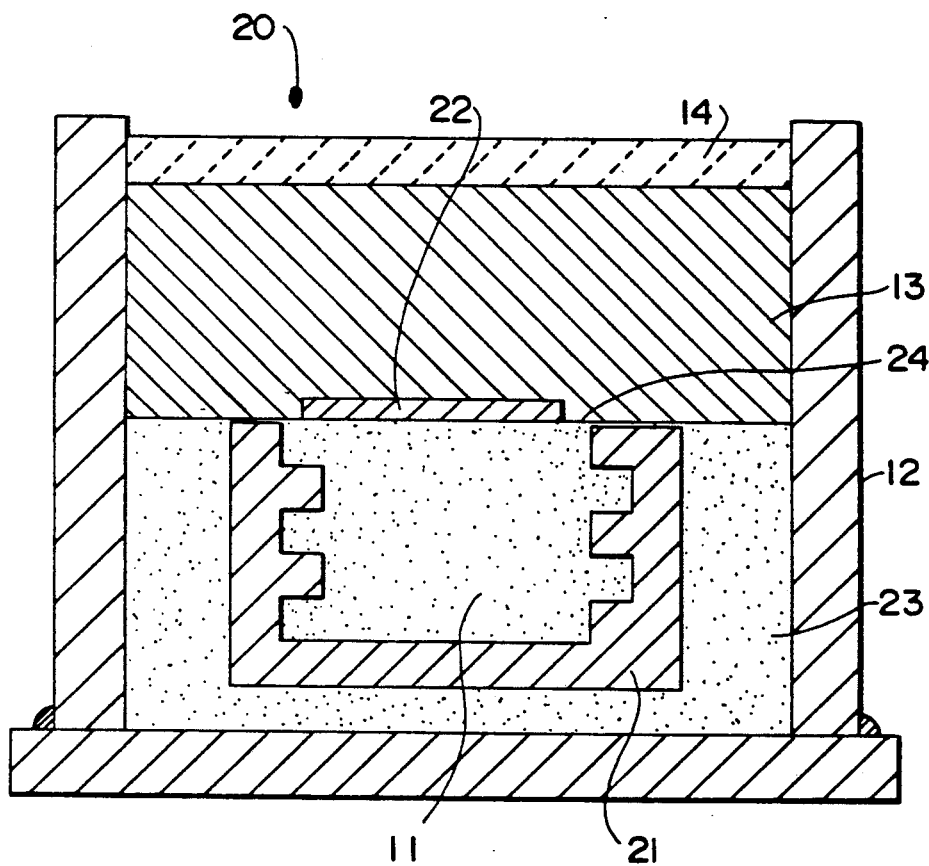
FIG. 3 is a schematic cross-sectional view of a typical lay-up according to the present invention which is utilized to form a metal matrix composite body with a net shaped outer surface.

As illustrated in FIG. 3, alternative lay-ups 20 of the present invention can be constructed for molding shapes which differ from the shape of the impermeable container. By way of example, a mold 21, which has internal dimensions conforming to the desired external dimensions of the metal matrix composite component to be formed, can be filled with a filler material 11 to be infiltrated. The filler-filled mold 21 can then be placed within a bed 23 which is substantially impermeable to infiltration of molten matrix metal. Such impermeable bed can, for example, be comprised of any suitable particulate barrier, such as fine mesh alumina. As set forth in greater detail below and in the Examples, suitable molds may be made from coated or uncoated metals, such as stainless steel, graphite, ceramics, ceramic composites, clay, plaster, alumina or silica castings, or other refractory materials which constitute suitable barrier means to inhibit infiltration or which have been coated or otherwise have suitable barrier means interspersed between the mold and the filler to be infiltrated. The molds are preferably economically produced, and may be reusable or disposable. Moreover, the molds preferably are easily formed to replicate the shape of the desired final composite. Although, in certain applications, the molds will be bonded to and retained as part of the final composite, in most applications the molds preferably should be readily separated and removed from and should not bond to or react with the finally formed metal matrix composite body.

After location of the filler-filled mold in the substantially impermeable bed 23, a graphite foil 22 or any other suitable material may, but need not, be located above the mold to facilitate separation of the mold and final composite from any remaining matrix metal after infiltration is complete. In the event a material 22 (e.g., graphite foil) is interposed between the matrix metal 13 and the mold 21, a suitable channel or space 24 should be provided to enable effective infiltration of the matrix metal 13 into the filler material 11.

Molten matrix metal 13 is then poured over the substantially impermeable bed 23, mold 21 and filler material 11, and an extrinsic seal 14 is formed above the molten matrix metal 13 or an intrinsic seal (not shown) is formed between the matrix metal 13 and the impermeable container 12. The lay-up 20 is then placed in an air atmosphere furnace in accordance with the method of the present invention. Infiltration of filler material 11 within the mold 21 by molten matrix metal 13 occurs without infiltration of the substantially impermeable bed 23 surrounding the mold 21.

Figure 4:
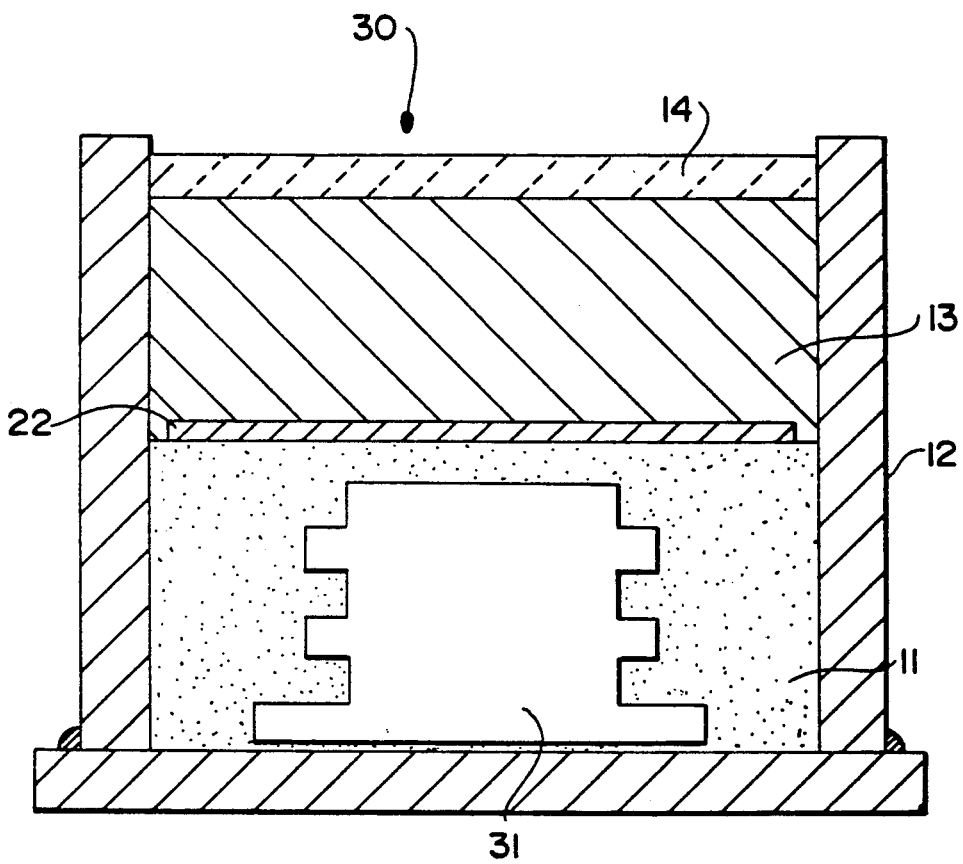
FIG. 4 is a schematic cross-sectional view of a typical lay-up according to the method of the present invention which is utilized to form a metal matrix composite with a net shaped internal cavity.

In an alternative generalized embodiment 30 of the present invention, as illustrated in FIG. 4, a member or mandrel 31, which is impermeable to molten matrix metal, can be used to function as a barrier to define a shape of a metal matrix composite component to be formed. Impermeable member 31 may be formed from any material which will remain substantially uninfiltrated under the process conditions. If member 31 is to be removed, it should be made from a material which facilitates removal, e.g., by physical, chemical, or mechanical means. As shown in FIG. 4, such barrier members may form only one defined boundary of the component to be formed. Alternatively, a plurality of such members could be used to define complex shapes. Suitable materials for barrier members 31 include the materials discussed herein as suitable mold materials.

As shown in FIG. 4, shaped barrier member 31 is placed in a stainless steel or other suitable impermeable container 12 and the space between member 31 and the container is interspersed with a filler material 11 in accordance with the methods discussed above. Molten matrix metal 13 is thereafter poured over the filler material 11, encasing member 31, and an extrinsic or intrinsic seal 14 is formed. The entire lay-up 30 is thereafter placed in an air atmosphere furnace in accordance with the above-discussed self-generated vacuum process. Graphite foil or other suitable release facilitating means 22 can be interposed between the matrix metal 13 and the filler material 11, in the manner discussed above.

Figure 5:
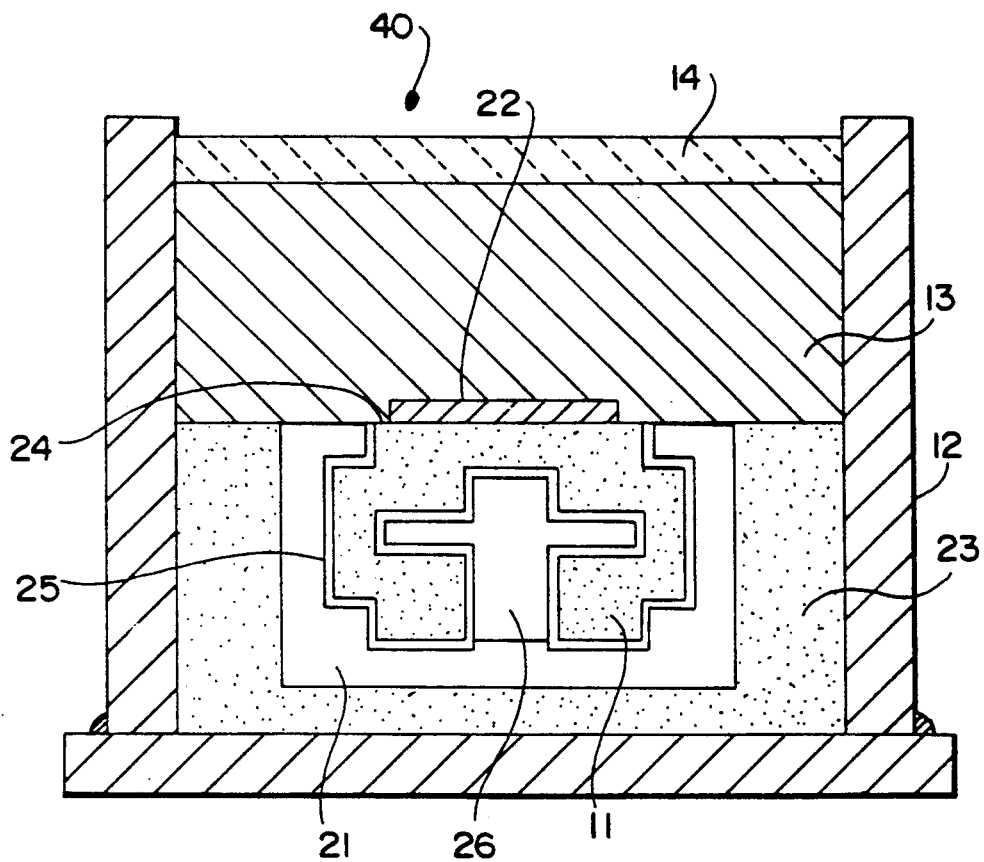
FIG. 5 is a schematic cross-sectional view of a typical lay-up according to the method of the present invention which is utilized to form a net shaped composite body with net shaped inner and outer dimensions.

In yet another embodiment of the invention, an alternative lay-up 40, illustrated in FIG. 5, contains both the internal and external shape of a metal matrix composite component to be formed. By way of example, a mold 21 which has internal dimensions conforming to the desired external dimensions of the metal matrix composite component, and a member or mandrel 26, which has outer dimensions conforming to the desired internal dimension of the metal matrix composite component to be formed, are made. Mandrel 26 may be either a portion of the barrier mold or may be inserted into the barrier mold after the mold is made. If the mandrel 26 is to be removed, it should preferably be made from a material which facilitates removal (e.g., can be removed by a physical, chemical, or mechanical means). A plurality of such members may be used to define complex internal shapes. The space between mold 21 and mandrel 26 can be filled with a filler material 11 to be infiltrated and the mold 21 can be placed within a substantially impermeable bed 23. Such impermeable bed can, for example, be comprised of any suitable particulate barrier, such as fine grit alumina which is not infiltrated by molten matrix metal under the process conditions. As set forth in greater detail below and in the Examples, suitable molds and mandrels may be made from coated or uncoated metals, such as stainless steel, graphite, ceramics, ceramic composites, clay, plaster, alumina or silica castings, or other refractory materials which constitute suitable barrier means to inhibit infiltration or which have been coated or otherwise have suitable barrier means interspersed between the mold and the mandrel and the filler to be infiltrated. The molds and mandrels are preferably economically produced, and may be reusable or disposable. Moreover, the molds and mandrels preferably are easily formed to replicate the shape of the desired final metal matrix composite to be formed. Although, in certain applications, the molds and mandrels will be bonded to and retained as an integral part of the final composite, in most applications the molds and mandrels preferably should be readily separated and removable from and should not bond to or react with the formed metal matrix composite component.

After location of the filler-filled mold in the bed, a graphite foil 22 or other suitable material may, but need not, be located above the mold containing the mandrel to facilitate separation of the mold and final composite from any remaining matrix metal after infiltration is complete. In the event a material 22 is interposed between the matrix metal alloy 13 and the mold 21 containing the mandrel 26, a suitable channel or space 24 should be provided to enable effective infiltration of the matrix metal into the filler material.

Molten matrix metal alloy 13 is then poured over the bedding, the mold and the filler material, and an extrinsic or intrinsic seal 14 thereafter should be formed. The lay-up is then placed in an air atmosphere box furnace in accordance with the method of the present invention. Infiltration of filler within the mold results without infiltration of the bedding surrounding the mold and filler after a self-generated vacuum has been contacted with the impermeable mold.

Several specific molding procedures and apparatuses may be employed in accordance with the present invention. A master component may be utilized to form a mold from plaster, colloidal alumina, colloidal silica or any other suitable means. The master component may be directly used to form a final mold or may be used to form an intermediary mold (e.g., a rubber, plastic, wax, or other suitable mold) for use in forming a final mold. It is significant, however, that the final mold and mandrel be chemically and physically able to withstand process conditions without being damaged or infiltrated, and that they duplicate the master component to enable net or near-net shape components to be produced from the final mold in accordance with the present invention.

In one embodiment of the present invention, discussed in detail in Examples 3-4, a negative rubber mold is made of a master component, and a rubber positive mold is thereafter made from the negative rubber mold. The rubber positive mold is then used to form a barrier mold which is used as a final mold to contain the filler material to be infiltrated by molten matrix metal. Coatings may be required on some molds to ensure that infiltration does not progress into the mold, thereby ensuring that good surface finishes and net shape characteristics are obtained. Satisfactory coatings for use with some molds include colloidal silica, colloidal alumina, colloidal vermiculite, colloidal graphite, graphite, aluminum paint, and other coatings. These coatings may also promote the separation of the mold from the final metal matrix composite component.

In a modified form of the above-described embodiment, discussed in detail in Example 1, rather than forming a rubber positive mold from the rubber negative mold, a plaster positive mold is made which is coated with a debonding material. From the plaster positive mold, a negative mold is made from plaster, colloidal alumina, colloidal silica or any other suitable material(s). The plaster positive mold is thereafter removed from the plaster negative mold by any suitable means. The negative shell is thereafter coated with an appropriate barrier coating and used as a barrier mold for containing filler material for infiltration by molten matrix metal.

Lost wax or lost foam processes may also be used to form molds to be used with the self-generated vacuum process, as discussed in greater detail in the Examples. Specifically, a desired ultimate shape for a metal matrix composite body is first formed from wax or polystyrene foam or any other suitable material capable of being physically removed, chemically removed and/or volatilized upon heating. Such wax, foam or other material is thereafter embedded in a mold material of the types discussed above. The mold material is thereafter subjected to an appropriate chemical or heating treatment, as required to remove or volatilize the mold material, thereby resulting in a void in the mold material. Such void may thereafter be filled with filler material and infiltrated in accordance with the present invention.

Although FIGS. 3, 4, and 5 illustrate the use of a single mold in each impermeable container, a plurality of molds can be stacked and/or placed side-by-side in a particular container for processing.

Figure 6:
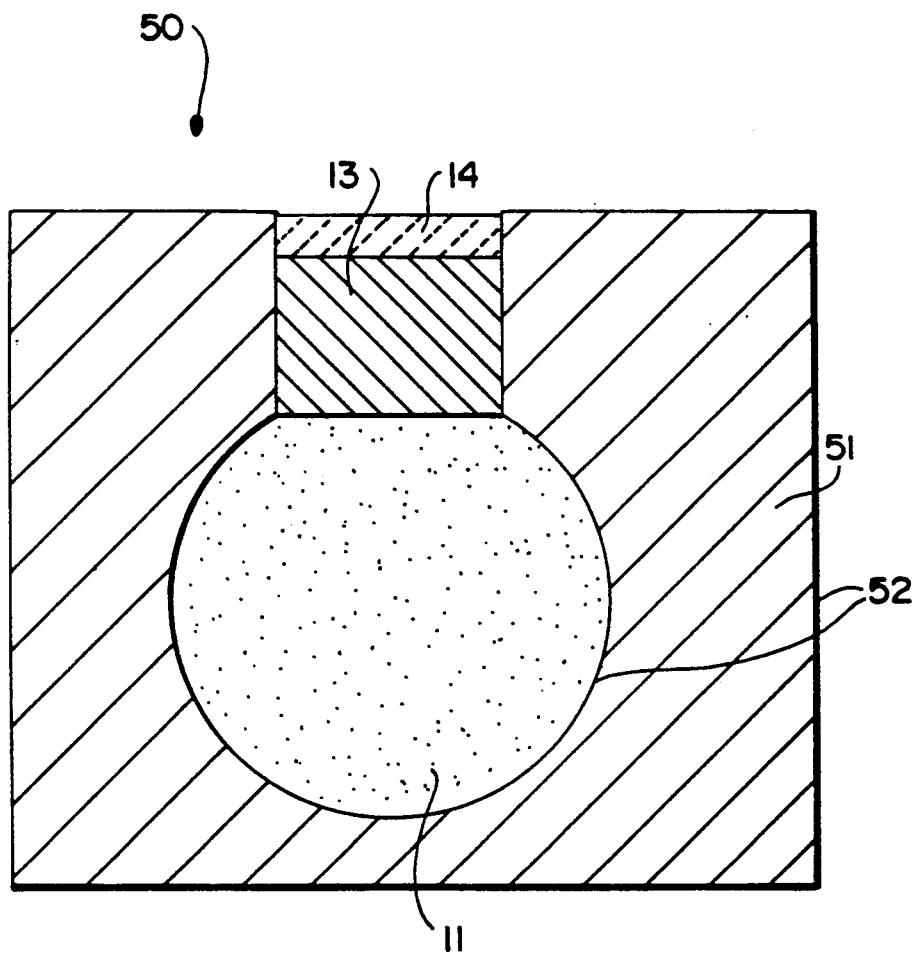
FIG. 6 is a schematic cross-sectional view of a typical mold according to the present invention utilized to form a net shaped metal matrix composite body.

Additionally, although the above discussion describes lay-ups in which the molds are placed within a separate gas impermeable container, it is possible to dispense entirely with a separate gas impermeable container. Instead, a gas impermeable mold can be used, or a permeable mold can be rendered impermeable. The sealing means can thereafter be placed directly over the mold, such that the mold acts as an impermeable container. As illustrated in FIG. 6, a mold 51 has an impermeable surface (or surfaces) 52 and an void filled with filler material 11. Matrix metal 13 is located adjacent to the filler and sealed by sealing means 14. The lay-up of FIG. 6 is thus a self-contained mold and an impermeable container from which a component in the configuration of the void of the mold can be made.

Various demonstrations of the present invention are included in the Examples immediately following. However, these Examples should be considered as being illustrative and should not be construed as limiting the scope of the invention as defined in the appended claims.

EXAMPLE 1

This Example demonstrates closed face negative molding techniques for forming net or near-net shaped metal matrix composite bodies of complex shapes via the self-generated vacuum technique. Specifically, this Example demonstrates the manufacture of small ball valves from a single master part having an outer diameter of about 1.25 inches (32 mm) with a cylindrical void having a diameter of about 0.73 inches (19 mm). FIG. 5 shows a schematic cross-section of a lay-up similar to the one used to form the near-net shape metal matrix composite bodies described below.

A negative rubber mold of the master part was made by casting a molding rubber compound (GI-1000, Plastic Tooling Supply Co., Easton, Pa., about 1 part by weight activator and about 10 parts by weight rubber base) around the master part. Once the negative rubber mold set sufficiently, three replicates of the master part were cast from the negative rubber mold using a mixture comprising by weight about 5% of a polyvinyl acetate based glue (ELMER'S ® glue, Borden Co., Columbus, Ohio), about 6% plaster of paris (Bondex, Bondex International Inc., Brunswick, Ohio), about 26% water and about 63% 500 grit $Al_2O_3$ (38 Alundum, Norton Co., Worcester). The replicates of the master part contained within the negative rubber molds were placed into a freezer held at about −18° C. After about 2 hours at about −18° C. the negative rubber molds and the replicates of the master part were separated. The replicates of the master part were then dried in an air oven set at about 46° C. Once sufficiently dried, the replicates were sprayed with two coats of silver paint (P-1140 distributed by Pep Boys, Philadelphia, Pa.).

After the replicates of the master part were formed and painted as described above, three barrier molds 21 were formed by mixing by weight about one part colloidal silica (NYACOL® 2040 NH$_4$, Nyacol Products, Ashland, Mass.), about 2 parts 500 grit Al$_2$O$_3$ (38 Alundum Norton Co., Worcester, Mass.), about 1 part 220 grit Al$_2$O$_3$ (38 Alundum Norton Co., Worcester, Mass.), and about 0.2 parts water. This barrier mixture, after being defoamed and deaired, was poured over the replicates of the master part and allowed to harden for about 2 hours at about room temperature. After about 2 hours, the excess water from the barrier mixture was poured off and the replicates of the master part surrounded by the barrier molds were placed into a freezer and held at about $-18°$ C. for about 8 hours. The replicates of the master part surrounded by the barrier molds were then placed into a resistance heated air atmosphere box furnace held at about 1000° C. for about one hour. Upon removal from the furnace, the replicates of the master part disintegrated and the powder remnants of the replicates of the master part were then blown out from inside the barrier molds 21. A coating mixture comprising by weight about 50% colloidal vermiculite (Microlite No. 903, W. R. Grace & Co., Lexington, Mass.), and about 50% water was then poured into the barrier molds. This coating mixture was allowed to reside in the fired barrier molds 21 for about 2 minutes and then poured out during which time a coating 25 formed on the barrier molds 21. Subsequently, the coated barrier molds 21 were placed into an oven set at about 110° C. for about two hours. After about two hours residence time, the coated barrier molds 21 were fired at about 1000° C. for about one hour.

The three barrier coated molds 21 were then placed into an impermeable container 12 constructed from 16 gauge (1.6 mm thick) type 304 stainless steel having an inner diameter of about 3 inches (76 mm) and height of about 3.25 inches (83 mm). The space between the coated barrier molds 21 and the stainless steel container 12 was then filled with a bed 23 comprising 500 grit Al$_2$O$_3$ (38 Alundum from the Norton Co.). One barrier mold 21 was filled with a filler material mixture 11 comprising by weight about 50 percent 54 grit Al$_2$O$_3$ and about 50 percent 90 grit Al$_2$O$_3$, (both 38 Alundum, Norton Co.). A second barrier mold 21 was filled with a filler material 11 comprising by weight about 50 percent Al$_2$O$_3$ and the remainder ZrO$_2$ (MCA 1360, Norton Co.), and the third barrier mold 21 was filled with a filler material mixture 11 comprising by weight about 98 percent 220 grit Al$_2$O$_3$ (El Alundum, Norton Co.), and about 2 percent $-325$ mesh magnesium powder (Atlantic Equipment Engineers, Bergenfield, N.J.).

These filler material filled barrier molds 21 were then each covered with a piece of graphite foil 22 (Permafoil from TT America, Portland, Ore.). A matrix metal 13 comprising a commercially available aluminum alloy designated 6061 with about an additional 2 weight percent magnesium alloyed therein was melted, and approximately 270 grams was poured into the stainless steel container 12 and onto the filler material filled barrier molds. Subsequently, powdered B$_2$O$_3$ was poured over the molten matrix metal 13, and the lay-up 40 was placed into a resistance heated air atmosphere box furnace set at about 900° C. About fifteen minutes were allowed for the B$_2$O$_3$ powder to substantially melt, degas, and form a gas impermeable seal 14. The lay-up 40 was held at about 900° C. for about two additional hours, after which time the lay-up 40 and its contents were removed from the furnace and placed onto a water cooled copper chill plate to directionally solidify the metal matrix composites.

Once at room temperature, the stainless steel container 12 was cut away from the solidified residual matrix metal and the coated barrier molds. It was observed that each section of graphite tape 22 facilitated the separation of the carcass of the matrix metal from each of the three metal matrix composite ball valves that were formed. In addition, it was observed that the matrix metal 13 had not infiltrated the bed 23 of 500 grit Al$_2$O$_3$. The coated barrier molds 21 were then placed into a sandblaster and the coated barrier molds 21 were sandblasted away revealing three net shape ball valves comprised of an aluminum metal matrix composite.

Figure 7:
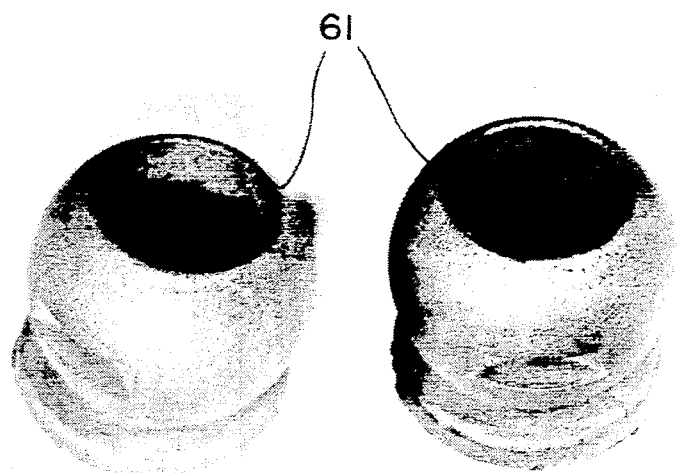
FIG. 7 is a photograph corresponding to the samples made according to Example 1.

FIG. 7 shows two of the aluminum matrix ball valves 61. Thus, this Example illustrates the use of different types of materials, such as very fine powders, graphite materials and bonded fine powder as barrier materials, during the formation of net-shaped aluminum matrix composites by the self-generated vacuum technique.

EXAMPLE 2

This Example demonstrates the closed face negative molding technique for forming net or near-net shaped composite bodies of complex shape via the self-generated vacuum technique using a bronze matrix metal.

The experimental procedures were substantially the same as those set forth in Example 1 except for the matrix metal and the processing temperature. The experimental lay-up 40 used in Example 2 was similar to that shown in FIG. 5. The bronze matrix metal 13 was comprised by weight of about 6% Si, 0.5% Fe, 0.5% Al and the balance copper. The stainless steel container 12 had an inner diameter of about 1.63 inches (41 mm) and a height of about 2.63 inches (67 mm). The filler material 11 was 90 grit Al$_2$O$_3$ (El Alundum, Norton Co.). The lay-up 40 was held at about 1100° C. for about 2.25 hours in a resistance heated air atmosphere box furnace prior to being directionally solidified on a water cooled copper chill plate.

Figure 8:
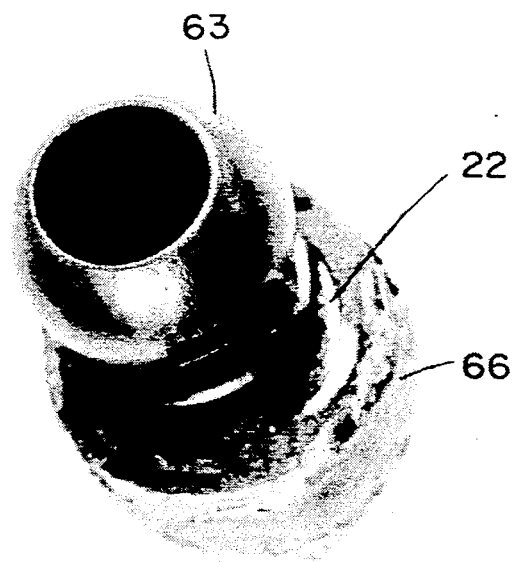
FIG. 8 is a photograph corresponding to the sample made according to Example 2.

At room temperature, the lay-up 40 was disassembled and, as in Example 1, it was observed that the graphite foil 22 facilitated the separation of the carcass of the matrix metal 66 from the new matrix composite ball valve 63 as shown in FIG. 8. In addition, it was observed that the matrix metal 13 had not infiltrated the bed 23 of 500 grit Al$_2$O$_3$. The coated barrier mold 21 was then placed into a sandblaster and the coated barrier shell 21 was sandblasted away revealing a net shape ball valve comprised of a bronze metal matrix composite. Specifically, FIG. 8 shows a photograph of the bronze metal matrix composite ball valve 63, remnants of the graphite foil 22 and the carcass of the bronze matrix metal 66 attached thereto. Thus, this Example illustrates that different types of materials, such as very fine beddings, graphite materials and bonded fine powders, can function as barrier materials during the formation of bronze matrix composite bodies by the self-generated vacuum technique.

EXAMPLES 3-4

These Examples demonstrates open face positive molding techniques for forming net or near-net shaped metal matrix composite bodies having complex shapes, via the self-generated vacuum technique. Specifically, Examples 3 and 4 describe the use of an aluminum matrix metal and a bronze matrix metal, respectively, to manufacture two metal matrix composite gears from a master part having an outer diameter of about 1.5 (38 mm) and a maximum thickness of about 0.4 inch (10 mm). The experimental lay-ups used in Examples 3 and 4 were similar to those shown in FIG. 3.

A negative rubber mold was formed of the master part by casting a rubber molding compound (GI-1000, Plastic Tooling Co., Easton, Pa., about 1 part by weight activator and about 10 parts by weight rubber base) around the master part. Once the negative rubber mold had sufficiently hardened, the master part and the negative rubber mold were separated, and the negative rubber mold was spray coated twice with a fluorocarbon based dry lubricant (MS-122, Miller-Stephenson Chemical Company, Inc., Danbury, Conn.). A positive rubber mold was then cast from the negative rubber mold again from GI-1000 molding rubber, formulated as above. Once sufficiently set, the positive rubber mold was removed from the negative rubber mold and was thereafter used to form two barrier molds 21 for the respective parts, as set forth below.

The barrier molds 21 were formed by mixing about one part by weight colloidal silica (NYACOL® 2040 NH4, Nyacol Products of Ashland, Mass.), about 2 parts by weight 500 grit $Al_2O_3$ (38 Alundum, Norton Co.) about 1 part by weight 220 grit $Al_2O_3$ (38 Alundum, Norton Co.), and about 0.2 parts by weight water. This mixture, after being defoamed and deaired, was poured over the positive rubber mold and allowed to harden for about 2 hours at about room temperature. After about 2 hours, the excess water from the hardened mixture was poured off and the positive rubber mold with the barrier mold material was placed into a freezer set at about $-18°$ C. for about 8 hours. The positive rubber mold was then separated from each frozen barrier mold 21 and each barrier mold 21 was placed into a resistance heated air atmosphere box furnace set at about 1000° C. for about one hour. A coating mixture comprising about 50% colloidal vermiculite, (Microlite No. 903, W. R. Grace & Co., Lexington, Mass.) and about 50% water was placed into the cavity of each barrier mold 21. The coating mixture was allowed to reside in the fired barrier molds 21 for about 2 minutes and then poured out, during which time a coating (not shown in FIG. 3) formed in the cavity of each barrier mold 21. Subsequently, the coated barrier molds 21 were placed into an oven at about 110° C. for about two hours. After about two hours, the coated barrier molds 21 were once again fired at about 1000° C. for about one hour.

Each coated barrier mold 21 was then placed into a separate stainless steel container 12 substantially the same as that described in Example 1. The space between the barrier molds 21 and the stainless steel container 12 was then filled with a bed 23 comprising 500 grit $Al_2O_3$ (38 Alundum, Norton Co.). In Example 3, a filler material 11 comprising 90 grit $Al_2O_3$ (38 Alundum Norton Co.) was placed into the coated barrier mold 21 and leveled. In Example 4, a filler material 11 comprising 90 grit $Al_2O_3$ (38 Alundum, Norton, Co.) was placed into the coated barrier mold 21 and leveled. The filler material filled barrier mold 21 used with the bronze matrix metal was covered with a piece of graphite foil 22, (Perma-foil from TT America, Portland, Ore.).

In Example 3, a molten aluminum matrix metal 13 comprising by weight about 7.5-9.5% Si, 3.0-4.0% Cu, $\leq 2.9\%$ Zn, 0.2-0.3% Mg, $\leq 1.3\%$ Fe, $\leq 0.5\%$ Mn, $\leq 0.35\%$ Sn and the balance Al was poured into the stainless steel container 12 to a depth of about 0.5 inch (13 mm) and over the filler material filled barrier mold 21. In Example 4, a molten bronze matrix metal 13 comprising by weight about 6% Si, about 0.5% Fe, about 0.5% Al and the balance Cu was poured to approximately 0.5 inch (1.3 mm) depth into the stainless steel container 12 over the graphite foil 22 covered barrier mold 21. Subsequently, powdered $B_2O_3$ was poured over the molten matrix metals 13 to substantially completely cover them and the lay-ups 20 were placed into a resistance heated air atmosphere box furnaces set at about 900° C. for Example 3 and at about 1100° C. for Example 4. About fifteen minutes were allowed for the $B_2O_3$ powder to substantially melt, degas and form a gas impermeable seal 14. The lay-up 20 of Example 3 was held at about 900° C. for about 2 hours, and the lay-up 20 of Example 4 was held at about 1100° C. for about 2 hours, after which time the respective lay-ups 20 were removed from the furnaces and placed on a water cooled copper chill plate to directionally solidify the matrix metal 13.

Figure 9A:
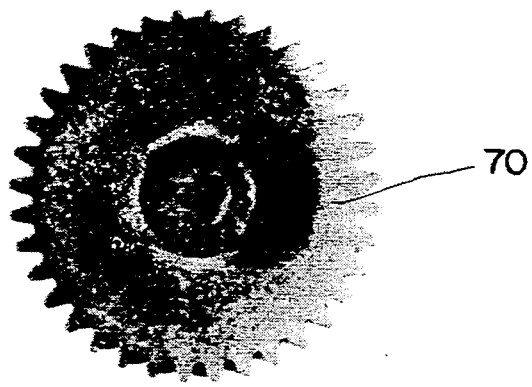
FIG. 9a is a photograph corresponding to the sample made according to Example 3.
Figure 9B:
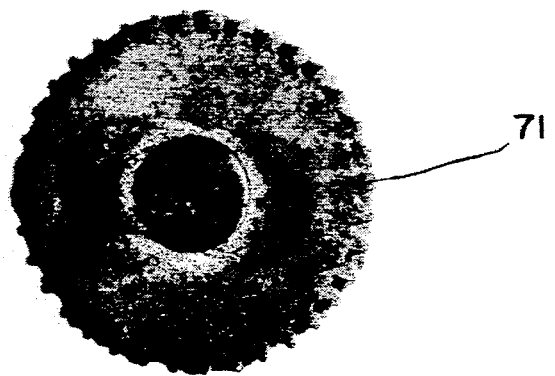
FIG. 9b is a photograph corresponding to the sample made according to Example 4.

Once at room temperature, each stainless steel container 12 was cut away from the respective barrier molds 21. It was observed for Example 4, that the graphite foil 22 permitted the separation of the carcass of the matrix metal from the metal matrix composite that was formed. Moreover, it was observed that for both Examples 3 and 4, fully infiltrated metal matrix composite bodies exhibiting excellent near-net shape characteristics were obtained. Specifically, FIG. 9a shows a photograph corresponding to the aluminum matrix gear 70 formed in Example 3 and FIG. 9b shows a photograph corresponding to the bronze matrix gear 71 formed in Example 4.

EXAMPLE 5

Figure 10A:
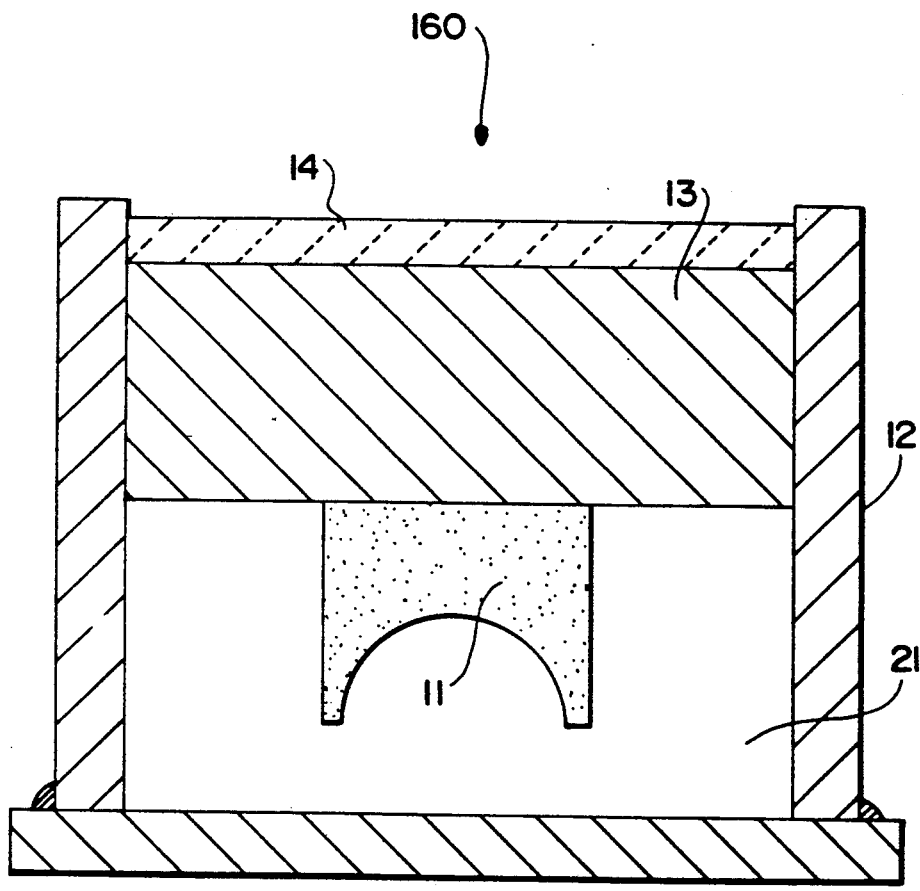
FIG. 10a is a schematic cross-sectional view of a typical lay-up according to the method of the present invention utilized to make net shaped metal matrix composite bodies.

This Example demonstrates the use of a lost wax molding technique to form a net or near-net shaped metal matrix composite body of complex shape via the self-generated vacuum technique. Specifically, Example 5 pertains to the manufacture of an aluminum metal matrix composite piston for an internal combustion engine from a master part having an outer diameter of about 0.75 inch (199 mm) and a maximum height of about 0.75 inch (19 mm). FIG. 10a is a cross-sectional schematic of the experimental lay-up used in Example 5.

A negative rubber mold was made by casting a molding rubber compound (GI-1000, Plastic Tooling Co., Easton, Pa., and by weight about 1 part activator and about 10 parts rubber base) around the master part. Once sufficiently set, a positive replica of the master part was made by pouring molten wax (No. 9 red extruded wax, Casting Supply House New York, N.Y.) into the negative rubber mold. Once the wax had solidified, the rubber mold was stripped from the positive wax replicate of the piston.

The positive wax replicate was then placed into a cylindrical stainless steel container 12. A barrier mixture, comprising by weight about 3 parts 500 grit $Al_2O_3$ (38 Alundum, Norton Co.) and about 1 part colloidal alumina (Bluonic A distributed by Wesbond Corporation, Wilmington, Del.) was poured into the stainless steel container 12 to a depth substantially the height of the positive wax replicate. After at least about 6 hours, the barrier mixture hardened to form a barrier shell 21. The stainless steel container 12 and its contents were inverted and placed into an air atmosphere oven set at about 180° C. After about 3 hours at about 180° C. the positive wax replicate melted and provided a cavity in the barrier mold 21. The stainless steel container and its contents were then placed into a resistance heated air atmosphere box furnace, set at about 1000° C., for about 1 hour to burn out any remaining wax, thereby refining the negative image of the master part in the barrier mold 21.

The void created in the barrier mold 21 by the volatilized wax was then filled with a filler material 11 comprising 220 grit SiC (39 Crystolon, Norton Co.). An aluminum matrix metal comprising by weight about 7.5–9.5% Si, 3.0–4.0% Cu, $\leq$2.9% Zn, 0.2–0.3% Mg, $\leq$1.3% Fe, $\leq$0.5% Mn, $\leq$0.35% Sn and the balance aluminum, was then melted and poured into the stainless steel container and over the 220 grit SiC filled barrier mold 21 to the depth of about 0.5 inch (13 mm). Powdered $B_2O_3$ (Fisher Scientific) was used to cover the molten aluminum matrix metal surface.

The lay-up 160, comprising the stainless steel container 12 and its contents, was then placed into a resistance heated air atmosphere box furnace set at about 850° C. After about 16 hours at about 850° C., during which time the $B_2O_3$ had melted, degassed and formed a gas impermeable seal 14, the lay-up was removed from the furnace and cooled.

Figure 10B:
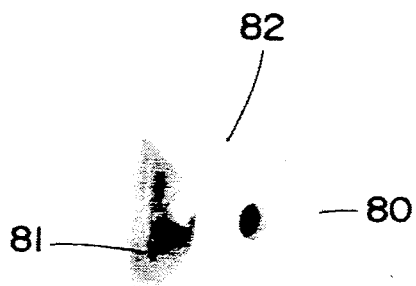
FIG. 10b is a photograph corresponding to the sample made according to Example 5.

Once the lay-up 160 cooled to room temperature, the stainless steel container 12 was removed and the barrier mold 21 was sandblasted away to reveal a near-net shape aluminum metal matrix composite piston. Specifically, FIG. 10b is a photograph corresponding to the aluminum metal matrix composite piston 80 after the outer surface 82 had been machined. FIG. 10b shows that the internal cavity 81 of the piston replicated well.

EXAMPLE 6

The method of Example 5 was substantially repeated except that the barrier mold 21 was comprised of a mixture of about 2 parts 220 grit and about 1 part 500 grit $Al_2O_3$ (both 38 Alundum, Norton Co., Worcester, Mass.) and about 1 part colloidal alumina (Bluonic A distributed by Wesbond Corporation, Wilmington, Del.); the filler material 11 comprised 90 grit SiC (39 Crystolon from Norton Co); and the master part had an outer diameter of about 2.75 inches (70 mm) and a height of about 2.5 inches (64 mm).

Figure 11A:
FIG. 11a is a photograph corresponding to the unfinished sample made according to Example 6.
Figure 11B:
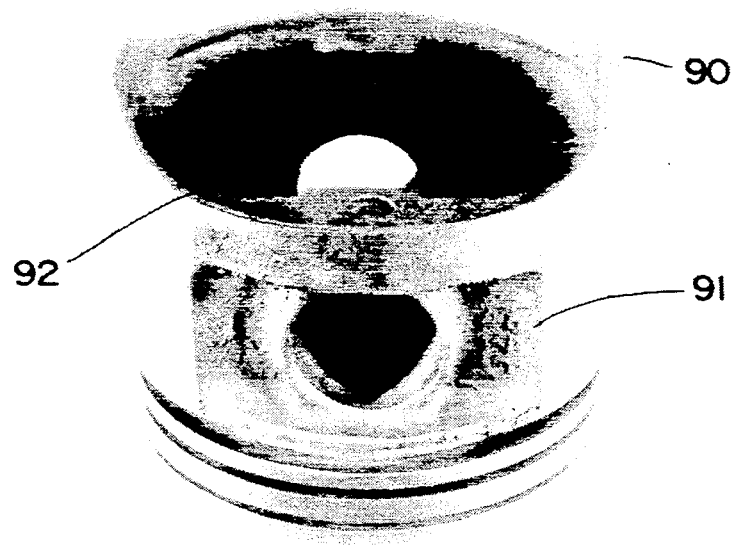
FIG. 11b is a photograph corresponding to the finished sample made according to Example 6.

The lay-up 160, was assembled as in Example 5, was held at about 850° C. for about 4 hours and then directionally solidified on a water cooled copper plate. As in Example 5, the matrix metal 13 fully infiltrated the filler material 11 and a near-net shape aluminum metal matrix composite piston was retrieved. Specifically, FIG. 11a is a photograph corresponding to aluminum metal matrix composite piston 90 made according to this Example in the sandblasted condition; and FIG. 11b is a photograph corresponding to same aluminum metal matrix composite piston 90 with the outer surface 91 machined.

EXAMPLE 7

This Example demonstrates the use of a graphite mold to form a metal matrix composite body using the self-generated vacuum technique. The experimental lay-up 20 used in this example is similar to that shown in FIG. 3.

A graphite mold 21 (ATJ grade graphite Union Carbide and obtained from MGP, Womelsdorf, Penn.), having an inner diameter of about 1.25 inches (32 mm), a height of about 2 inches (51 mm) and a wall thickness of about 0.5 inch (13 mm), was placed into the bottom of a stainless steel container 12, having inner diameter of about 2.6 inches (67 mm) and a height of 3.5 inches (89 mm) constructed from 16 gauge (1.6 mm thick) Type 304 stainless steel. The space between the graphite mold 21 and the stainless steel container 12 was substantially filled to the top of the graphite mold 21 with a bed 23 comprising 500 grit $Al_2O_3$ (El Alundum, Norton Co., Worcester, Mass.). The cylindrical cavity of the graphite mold 21 was then substantially filled with about 80 grams of a filler material 11 comprising 90 grit $Al_2O_3$ (38 Alundum Norton Co.). The surface of the bed 23 at the top of the graphite mold 21 was substantially, but not completely, covered with a piece of graphite foil 22 (Perma-foil from TT America, Portland, Ore.). About 1 inch (25 mm) of a molten bronze matrix metal 13, comprising by weight about 6% Si, about 0.5% Fe, about 0.5% Al and the balance copper, at a temperature of about 1100° C., was poured into stainless steel container 12 and over the graphite foil cover graphite mold 21. About 20 grams of powdered $B_2O_3$ (Aesar ®, Johnson Matthey, Seabrook, N.H.) was used to substantially cover the surface of the bronze matrix metal 13. The lay-up 20, comprising the stainless steel container 12 and its contents, was placed into a resistance heated air atmosphere box furnace set at a temperature of about 1100° C. After about 2 hours at about 1100° C., during which time the $B_2O_3$ substantially completely melted, degassed and formed a gas impermeable seal 14, the lay-up 20, comprising the stainless steel container 12 and its contents were removed from the furnace and placed on a water cooled copper chill plate to directionally solidify the bronze matrix metal.

Figure 12:
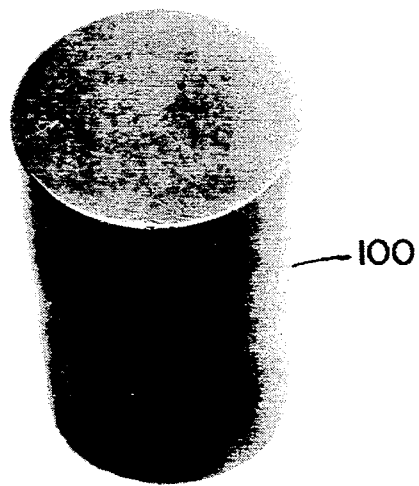
FIG. 12 is a photograph corresponding to the sample made according to Example 7.

Once at room temperature, the lay-up 20 was disassembled and it was observed that the bronze matrix metal 13 had infiltrated the filler material 11 to form a bronze metal matrix composite cylinder having a good surface finish on all surfaces. Specifically, FIG. 12 shows a photograph corresponding to the bronze metal matrix composite cylinder 100 made in accordance with the procedures set forth in this Example.

EXAMPLE 8

This Example demonstrates the use of a graphite member or mandrel to shape the interior surface of a metal matrix composite body made using the self-generated vacuum technique. The experimental lay-up used in this Example was similar to that shown in FIG. 4. Specifically, a ribbed graphite mandrel 31 (AGSX graphite, Union Carbide), having an inner diameter of about 1 inch (24 mm) and a height of about 1.5 inches (38 mm), with ribs positioned about every 20° along the perimeter of the mandrel 31, measuring about 0.16 inch (1.6 mm) beyond the perimeter of the mandrel and having a width of about 0.1 inch (2.5 mm) and extending the 1.5 inches (38 mm) length of the graphite mandrel 31, was used to form a metal matrix composite body having a ribbed inner diameter corresponding to the outer diameter of the mandrel 31 and a smooth outer diameter.

The graphite mandrel 31, shaped as a negative of the desired configuration of the interior of the final desired composite, was placed in a container 12 having an inner diameter of about 1.9 inches (48 mm) and a height of about 3.5 inches (89 mm) and constructed from 16 gauge (1.6 mm thick) Type 304 stainless steel. A filler material 11, comprising by weight 95 percent 90 grit SiC (39 Crystolon, Norton Co.) and about 5 percent tin −325 mesh (Atlantic Equipment Engineers, Bergenfield, N.J.), was poured into the annulus defined between the stainless steel container 12 and the ribbed graphite mandrel 31. About 1.5 inches (38 mm) of molten bronze matrix metal 13, comprising by weight about 5% Si, about 2% Fe, about 3% Zn and the balance copper, was poured into the stainless steel container and onto the 90 grit SiC filler material 11 surrounding the ribbed graphite mandrel 31. About 20 grams of powdered $B_2O_3$ (Aesar ®, Johnson Matthey, Seabrook, N.H.) was then used to substantially completely cover the molten bronze matrix metal surface. The lay-up 30, comprising the stainless steel container 12 and its contents, was placed into a resistance heated air atmosphere box furnace set at about 1100° C. After about 2 hours at about 1100° C, during which time the $B_2O_3$ had substantially melted, degassed and formed a gas impermeable seal 14, and the matrix metal 13 level was observed to drop, the lay-up 30 was removed from the furnace to solidify the bronze matrix composite. At room temperature, the lay-up 30 was disassembled to reveal a bronze matrix composite body surrounding the ribbed graphite mandrel 31.

Figure 13:
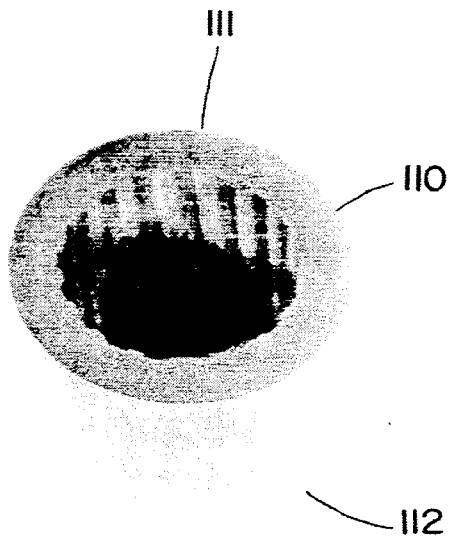
FIG. 13 is a photograph corresponding to the sample made according to Example 8.

The ribbed graphite mandrel 31 was removed from the bronze metal matrix composite body by placing the bronze matrix composite body surrounding the ribbed graphite mandrel 31 into a resistance heated air atmosphere box furnace set at about 600° C. After about 12 hours at about 600° C., the ribbed graphite mandrel 31 had sufficiently completely oxidized and a bronze metal matrix composite body with an inner diameter inversely replicating the ribbed graphite mandrel was recovered. Specifically, FIG. 13 shows a photograph that corresponds to the bronze matrix composite cylinder 110 with its outer surface 112 machined and the inner surface 111 inversely replicating the outer surface of the graphite mandrel 31.

EXAMPLE 9

This Example demonstrates the use of a split mold to form a metal matrix composite body by the self-generated vacuum technique. FIG. 14 is a cross-sectional schematic view of the lay-up used in this Example.

A master mold, having an outer diameter of about 1.75 inches (45 mm) and a height of about 0.81 inch (21 mm) with a hemispherical cavity having a diameter of 1.38 inches (35 mm), was machined from a commercially available aluminum alloy. The master mold was placed coaxially into a commercially available PVC tube having an outer diameter of about 3 inches (76 mm), a height of about 1.5 inches (38 mm) and a wall thickness of about 0.38 inch (9.5 mm). A negative rubber mold was made by casting a molding rubber compound (GI-1000, Plastic Tooling Co., Easton, Pa., about 1 part by weight activator and about 10 parts by weight rubber base) into the annular space between the PVC tubing and the aluminum master mold.

Once the negative rubber mold had sufficiently hardened, cast positive barrier molds 21 were made from the negative rubber mold from a mixture comprising by weight about 1 part colloidal silica (NYACOL ® 20401 NH₄, Nyacol Products, Ashland, Mass.,) about 2 parts 500 grit $Al_2O_3$ (38 Alundum from Norton Co.) about 1 part 220 grit $Al_2O_3$ (38 Alundum, Norton Co.) and 0.2 parts by weight water. The positive barrier mold castings were allowed to harden for about 2 hours at about room temperature. After about 2 hours, the excess water from the casting mixture was poured off and the negative rubber molds containing the barrier molds 21 were placed into a freezer set at about −18° C. for about 8 hours. The negative rubber molds were then separated from the positive barrier molds 21 and the positive barrier molds 21 were then placed into a resistance heated air atmosphere (9 mm) hole 121 was drilled along the axis of the outer diameter of one barrier mold and through to the hemispherical cavity thereafter (as shown in FIG. 14). The positive barrier mold 21 having the hole therein was contacted with another positive barrier mold 21 such that a spherical cavity having a diameter of about 1.38 inches (35 mm) was formed therein. The two positive barrier molds 21 thus formed a split mold 122. A coating mixture comprising by weight 50% colloidal vermiculite (W. R. Grace & Co., Lexington, Mass.) and 50% water was poured into the spherical cavity of the split mold through the hole 121. The coating mixture was allowed to reside in the split mold 122 for about 2 minutes and then poured out, during which time a coating 25 formed in the spherical cavity of the split mold 122. Subsequently, the coated split mold 122 was placed into an oven set at about 110° C. for about 2 hours. After about 2 hours residence time, the coated split mold 122 was fired at about 1000° C. for about 1 hour.

The interior of the coated split-mold 122 was filled with a filler material 11 comprising 90 grit SiC (39 Crystolon, Norton Co.). The split-mold 122 was then placed in a stainless steel container 12 in a bed 23 comprising 500 grit $Al_2O_3$ (38 Alundum, Norton Co.). The hole 121 at the lower portion of the split mold 122 was substantially covered with graphite foil 22 (Perma-foil, TT America, Portland, OR). A molten bronze matrix metal 13 comprised by weight of about 5% Si, about 2% Fe, about 3% Zn and the balance copper was then poured into the stainless steel container 12 and onto the split mold 122 surrounded by the fine bedding 23 and a layer of $B_2O_3$ powder was poured over the molten matrix metal.

The lay-up 120, comprising the stainless steel container 12 and its contents, was then placed into a resistance heated air atmosphere box furnace set at about 1100° C. After about 3 hours at about 1100° C., the lay-up 120 was removed from the furnace to solidify the bronze metal matrix composite body. Once at room temperature, the split-mold 122 was disassembled to reveal that the molten bronze matrix metal 13 had infiltrated the filler material 11 to form a bronze metal matrix composite ball. In addition to demonstrating the use of split-molds, this Example demonstrates that matrix metals can be drawn upward into a barrier molds to infiltrate a filler material to form a metal matrix composite body.

EXAMPLE 10

This Example demonstrates the use of a barrier mandrel comprised of a fine grit bedding and a binder to define the interior shape of a metal matrix composite. A lay-up similar to that shown in FIG. 4 was used in this Example.

Specifically, an internal gear was formed by first making a barrier member or mandrel 31, having a negative shape of the desired internal configuration of the gear, from a mixture comprising by weight about 20% plaster of paris (Bondex, Bondex International, Inc. Brunswick, Ohio) and 80% 500 grit $Al_2O_3$ (38 Alundum, Norton Co.). Once sufficiently set and dried, the barrier mandrel 31 was centered in a cylindrical stainless steel container 12 having an inner diameter conforming to the desired outer diameter of the final metal matrix composite part to be formed. The space between the barrier mandrel 31 and the stainless steel container 12 was thereafter filled with a filler material 11 comprising by weight 90 percent 90 grit $Al_2O_3$ (38 Alundum Norton Co.) and 10 percent −325 mesh tin (Atlantic Equipment Engineer, Bergenfield, N.J.). A molten bronze matrix metal 13, comprised by weight of about 5% Si, about 2% Fe, about 3% Zn and the balance Cu, was poured into the stainless steel container 12 over the filler material 11 to a depth of about 1 inch (25 mm) and $B_2O_3$ powder was poured over the molten matrix metal to form an extrinsic seal 14, after the melting thereof.

Figure 15:
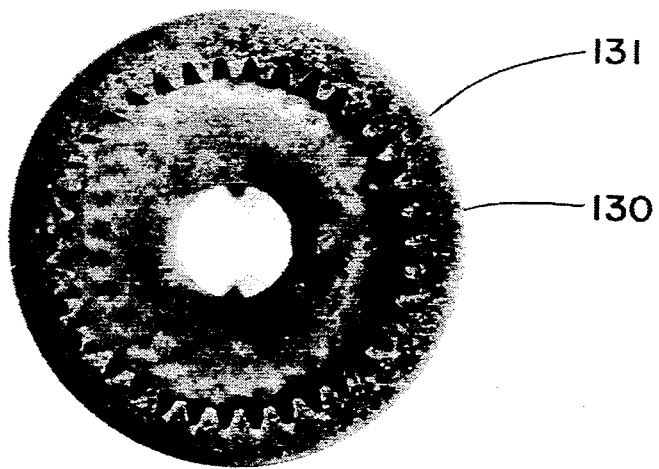
FIG. 15 is a photograph corresponding to the sample made according to Example 10.

The lay-up 30, comprising the stainless steel container and its contents, was placed into a resistance heated air atmosphere box furnace set at about 1100° C. After about 3 hours at about 1100° C., the lay-up 30 was removed from the furnace and cooled to room temperature. The barrier mandrel 31 was thereafter sandblasted from the formed bronze metal matrix composite body resulting in an internal shape in the metal matrix composite body conforming to the external surface of the barrier mandrel 31. Specifically, FIG. 15 shows a photograph corresponding to the bronze matrix composite body 130 with gears 131 on the interior portion of the bronze matrix composite body 130.

EXAMPLE 11

Figure 16A:
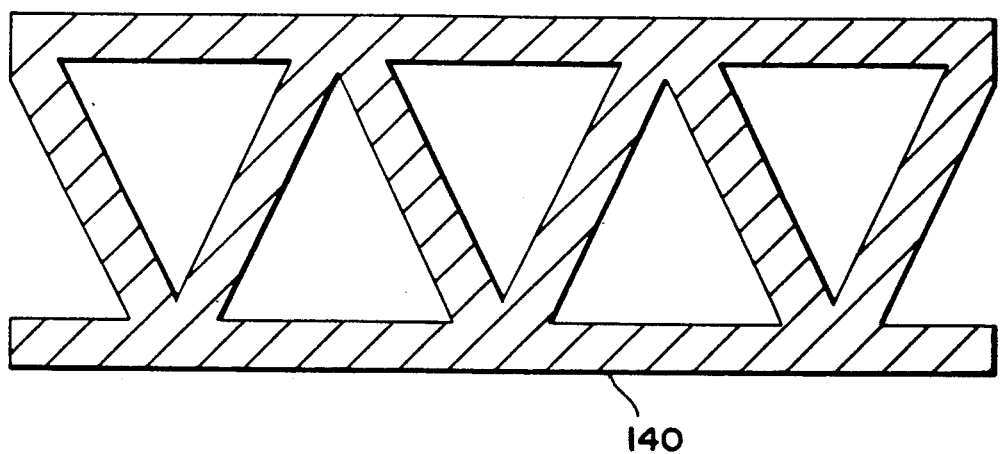
FIG. 16a is a schematic cross-sectional view of a pattern as used in Example 11.

This Example demonstrates that a relatively intricate metal matrix structure can be made using a fugitive mandrel technique. Specifically, a metal matrix truss was made from a balsawood master. The balsawood master was formed by glueing strips of commercially available balsawood together, as shown schematically in FIG. 16a. The balsawood master was then coated with at least two coats of silver paint (P-1140 distributed by Pep Boys, Philadelphia, Penn.). After the silver paint had dried, the balsawood master was attached to the bottom of a paper box having dimensions of about 5 inches (127 mm) by about 2 inches (51 mm) by about 1 inch (25 mm) high with a petroleum jelly (Vaseline ® Cheeseborough-Pond's, Inc., Greenwich, Conn.).

After the master part was attached to the paper box, a mixture for the barrier mold was formed by mixing by weight about 1 part colloidal silica (NYACOL ® 2040 NH4 A, Nyacol Products, Ashland, Mass.), about 2 parts 500 grit (38 Alundum, Norton Co., Worcester, Mass.), about 1 part 220 grit $Al_2O_3$ (38 Alundum, Norton Co., Worcester, Mass.), and about 0.2 parts water. This barrier mixture, after being defoamed and deaired, was poured over the balsawood master part and allowed to harden for about two hours at about room temperature. After about two hours, the excess water from the barrier mixture was absorbed with a towel and 220 grit $Al_2O_3$ (38 Alundum, Norton Co., Worcester, Mass.) was poured onto the surface of the casting to soak away any excess water. The barrier mixture surrounding the balsawood master part was then placed into a freezer and held at about −18° C. for about 8 hours. The hardened barrier material mold surrounding the balsawood master part was then placed for about 1 hour into a resistance heated air atmosphere box furnace held at about 1000° C. During this hour at about 1000° C., the balsawood burned away to form a inner cavity in the barrier mold. Upon removal from the furnace, the barrier mold was allowed to cool and the ash remnants of the balsawood where then blown out from the inside of the barrier mold. The barrier mold was cut to a size to fit within the impermeable container described below. A coating mixture comprising by weight about 50 percent colloidal vermiculite (Microlite No. 903, W. R. Grace & Co., Lexington, Mass.), and about 50 percent water was then poured into the barrier mold. This coating mixture was allowed to reside in the fired barrier mold for about 2 minutes during which time a coating formed on the barrier mold. Subsequently, the coated barrier mold was placed into an oven set at about 60° C. for about two hours. After about 2 hours at about 60° C., the coated barrier mold was fired at about 1000° C. for about 1 hour.

The coated barrier mold was then placed into an impermeable container constructed from 16 gauge (1.6 mm thick) type 304 stainless steel having inner dimensions of about 4.9 inches (125 mm) long by about 1.4 inches (36 mm) wide by about 1.7 inches (43 mm) deep. The space between the coated barrier mold and the stainless steel container was then filled with a bed comprising 500 grit $Al_2O_3$ (38 Alundum, Norton Co., Worcester, Mass.). The coated barrier mold was filled with a filler material comprising 220 grit $Al_2O_3$ (38 Alundum, Norton Co., Worcester, Mass.).

The filler material filled barrier mold was then covered with a piece of graphite foil (PERMA-FOIL ®, TT America, Portland, Ore.). A matrix metal comprising a commercially available aluminum alloy designated 6061 with about an additional 4 weight percent magnesium alloyed therein, was melted and poured into the stainless steel container and onto the graphite foil and thus covering the filler material in the barrier mold. Subsequently, powdered $B_2O_3$ was poured over the molten matrix metal and the lay-up was placed into a resistance heated air atmosphere box furnace set at about 850° C. About 15 minutes were allowed for the $B_2O_3$ to melt, degas, and form a gas impermeable seal. The lay-up was held at about 950° C. for about 2 additional hours, after which time the lay-up and its contents were removed from the furnace and placed onto a water cooled copper chill plate to directionally solidify the metal matrix composite.

Figure 16B:
FIG. 16b is a photograph corresponding to the sample made according to Example 11.

Once at room temperature, the stainless steel container was cut away from the solidified residual matrix metal and the coated barrier mold. It was observed that the graphite tape facilitated the separation of the carcass of the matrix metal from the metal matrix composite body. The coated barrier mold was then placed into a sandblaster and the coated barrier mold was sandblasted away revealing a net shape truss comprised of an aluminum metal matrix composite. Specifically, FIG. 16b shows a photograph corresponding to the aluminum metal matrix composite truss 141 made according to this Example.

EXAMPLE 12

This Example demonstrates the manufacture of a relatively intricate metal matrix structure using a lost wax technique. Specifically, a metal matrix truss was made from a master. The master 140, shown in FIG. 16a, was formed by glueing strips of regular sheet wax (165, Freeman Co., Belleville, N.J.), together. The wax master was then placed into a stainless steel container having a length of about 6 inches (152 mm), a width of about 2 inches (51 mm) and a height of about 2 inches (51 mm). A barrier mixture comprising by weight about 50 percent calcium aluminate cement (Secar 71, Lafarge Calcium Aluminates, Chesapeake, Va.), and about 50 percent 500 grit $Al_2O_3$ (39 Alundum, Norton Co.), and substantially sufficient water to make the barrier mixture castable was poured into the stainless steel container and over the wax master to the height of the wax master.

After the barrier mixture had sufficiently set in the stainless steel container and around the wax master, the wax master was removed by first placing the lay-up into an oven set at about 150° C. for about 3 hours and melting the wax master. The lay-up was then placed into a resistance heated air atmosphere furnace set at about 800° C. for approximately 1 hour to burn out any residual wax left after the melting to yield a negative barrier shell of the master wax truss. The space in the barrier shell was filled with a filler material of 90 grit SiC (39 Crystolon, Norton Co.). A molten aluminum matrix metal comprising by weight about 7.5-9.5% Si, 3.0-4.0% Cu, ≦2.9% Zn, 0.2-0.3% Mg, ≦1.3% Fe, ≦0.5% Mn, ≦0.35% Sn and the balance Al, was poured into the stainless steel container and onto the filler material filled barrier shell to a depth of about 0.5 inch (13 mm). $B_2O_3$ powder was then used to substantially completely cover the surface of the molten aluminum matrix metal. The lay-up, comprising the stainless steel container and its contents, was placed into a resistance heated air atmosphere furnace at about 850° C. After about 4 hours at about 850° C., during which the $B_2O_3$ had substantially melted, degassed, and formed a gas impermeable seal, the lay-up was removed and allowed to cool to room temperature. The lay-up was disassembled and the barrier shell was sandblasted away to reveal an aluminum matrix composite truss.

EXAMPLE 13

Figure 17:
FIG. 17 is a photograph corresponding to the sample made according to Example 12.

The method of Example 1 was substantially repeated to make a pump impeller having an outer diameter of about 3.5 inches (89 mm) except that a different matrix metal, processing temperature, and barrier shell were used. The barrier shell was formed from a mixture comprising by weight 2 parts 500 grit $Al_2O_3$ (38 Alundum, Norton Co.), 1 part 90 grit $Al_2O_3$ (38 Alundum Norton Co.) and 1 part colloidal alumina (Bluonic A obtained from Wesbond Corp., Wilmington, Del.). The matrix metal 13 was a bronze alloy comprising by weight about 6% Si, about 1% Fe, and the balance copper, and the filler material 11 was 90 grit SiC (39 Crystolon Norton, Co). The lay-up 40 was placed into a resistance heated air atmosphere furnace set at about 1100° C. and the time allowed for the matrix metal to infiltrate the filler material was about 3.5 hours. Specifically, FIG. 17 shows a photograph corresponding to the bronze matrix impeller 150 formed in the Example.

What is claimed is:

1. A method of making a metal matrix composite body comprising the steps of:
providing an impermeable container;
providing within said impermeable container a substantially impermeable barrier corresponding to a desired net shape of at least a portion of said metal matrix composite body;
contacting at least a portion of said impermeable barrier with a filler;
contacting at least a portion of said filler with a matrix metal; and
heating said impermeable container to a temperature above the melting temperature of the matrix and sealing said impermeable container to permit molten matrix metal to infiltrate at least a portion of said filler material up to at least a portion of said barrier by creating a self-generating vacuum within said impermeable container, said sealing comprising an extrinsic seal comprising at least one glassy material.

2. The method of claim 1, wherein said matrix metal comprises at least one material selected from the group consisting of aluminum, magnesium, bronze, copper and cast iron.

3. The method of claim 2, wherein said filler comprises at least one material selected from the group consisting of alumina, silicon carbide, zirconium, titanium nitride, boron carbide and mixtures thereof.

4. The method of claim 1, further comprising providing at least one wetting enhancer.

5. The method of claim 4, wherein said at least one wetting enhancer is alloyed with said matrix metal.

6. The method of claim 4, wherein said matrix metal comprises aluminum and said wetting enhancer comprises at least one material selected from the group consisting of magnesium, bismuth, lead and tin.

7. The method of claim 4, wherein said matrix metal comprises at least one of bronze and copper and said wetting enhancer comprises at least one material selected from the group consisting of selenium, tellurium and sulfur.

8. The method of claim 4, wherein said at least one wetting enhancer is supplied from an external source.

9. The method of claim 1, further comprising providing at least one seal facilitator.

10. The method of claim 1, wherein said sealing further comprises an intrinsic physical seal comprising a wetting of the impermeable container by said matrix metal.

11. The method of claim 1, wherein said sealing further comprises an intrinsic chemical seal comprising a reaction product of said matrix metal and said impermeable container.

12. The method of claim 1, wherein said filler comprises at least one material selected from the group consisting of powders, flakes, platelets, microspheres, whiskers, bubbles, fibers, particulates, fiber mats, chopped fibers, spheres, pellets, tubules and refractory cloths.

13. The method of claim 1, wherein said filler comprises at least one material selected from the group consisting of oxides, carbides, borides and nitrides.

14. The method of claim 1, wherein said impermeable container comprises at least one material selected from the group consisting of a ceramic, a metal, a glass and a polymer.

15. The method of claim 14, wherein said impermeable container comprises alumina or silicon carbide.

16. The method of claim 1, wherein said matrix metal comprises aluminum and said filler comprises at least one material selected from the group consisting of oxides, carbides, borides and nitrides.

17. The method of claim 1, further comprises directionally solidifying the formed shaped metal matrix composite body.

18. The method of claim 1, wherein said at least one glassy material comprises at least one material selected from the group consisting of boron glasses, silicon glasses and $B_2O_3$, which is at least partially molten during at least a portion of said infiltrating.

19. The method of claim 1, wherein infiltration of molten matrix metal occurs without the requirement for the application of external pressure or vacuum.

20. The method of claim 1, wherein substantially impermeable barrier is a mold made from a material selected from the group consisting of alumina, silica, graphite and plaster.

21. A method of making a metal matrix composite body comprising the steps of:
   providing an impermeable container having at least one opening therein;
   filling said impermeable container with a solid matrix metal and a filler;
   sealing said impermeable container; and
   heating said impermeable container to render said matrix metal molten and to create a self-generated vacuum within said impermeable container, thereby forming a metal matrix composite having a shape conforming at least in part to the interior shape of the impermeable container, said sealing comprising an extrinsic seal comprising at least one glassy material.

22. The method of claim 21, wherein said sealing is extrinsic to the matrix metal.

23. The method of claim 21, wherein said sealing further comprises an intrinsic seal which is intrinsic to the matrix metal.

24. The method of claim 21, wherein said matrix metal comprises at least one material selected from the group consisting of aluminum, magnesium, bronze, copper and cast iron.

25. The method of claim 24, wherein said filler comprises at least one material selected from the group consisting of alumina, silicon carbide, zirconium, titanium nitride, boron carbide and mixtures thereof.

26. The method of claim 21, further comprising providing at least one seal facilitator.

27. The method of claim 21, wherein said sealing further comprises an intrinsic physical seal comprising a wetting of the impermeable container by said matrix metal.

28. The method of claim 21, wherein said sealing further comprises an intrinsic chemical seal comprising a reaction product of said matrix metal and said impermeable container.

29. A method of making a shaped metal matrix composite body comprising the steps of:
   forming a reaction system comprising a matrix metal, a reactive atmosphere, an impermeable container, a permeable mass comprising at least one material selected from the group consisting of a loose mass of filler and a preform of filler, and a barrier means which contacts at least a portion of at least one surface of said permeable mass and which is at least partially spaced from said matrix metal for establishing at least one surface of said shaped metal matrix composite body;
   sealing the reaction system from an ambient atmosphere which is external to said reaction system so as to achieve a net pressure differential between said reactive atmosphere and said ambient atmosphere, the sealing comprising an extrinsic seal comprising at least one glassy material; and
   heating the sealed reaction system to render the matrix metal molten and to create a self-generated vacuum within said impermeable container and at least partially infiltrating said permeable mass with said molten matrix metal up to said barrier means by utilizing said net pressure differential, thereby forming said shaped metal matrix composite body having said at least one surface established by said barrier means.

30. The method of claim 29, wherein said sealing comprises substantially completely isolating said reactive atmosphere from said ambient atmosphere.

31. The method of claim 29, wherein said net pressure differential exists during at least a portion of said infiltrating of molten matrix metal into said permeable mass up to said barrier means.

32. The method of claim 29, wherein said matrix metal comprises at least one material selected from the group consisting of aluminum, magnesium, bronze, copper and cast iron.

33. The method of claim 32, wherein said filler comprises at least one material selected from the group consisting of alumina, silicon carbide, zirconium, titanium nitride, boron carbide and mixtures thereof.

34. The method of claim 29, further comprising providing at least one wetting enhancer to said reaction system.

35. The method of claim 34, wherein said at least one wetting enhancer is alloyed with said matrix metal.

36. The method of claim 34, wherein said matrix metal comprises aluminum and said setting enhancer comprises at least one material selected from the group consisting of magnesium, bismuth, lead and tin.

37. The method of claim 34, wherein said matrix metal comprises at least one bronze and copper and said wetting enhancer comprises at least one material selected from the group consisting of selenium, tellurium and sulfur.

38. The method of claim 34, wherein said at least one wetting enhancer is supplied from an external source.

39. The method of claim 29, further comprising providing at least one seal facilitator to said reaction system.

40. The method of claim 29, wherein said sealing further comprises an intrinsic chemical seal comprising a reaction product of said matrix metal and said ambient atmosphere.

41. The method of claim 29, wherein said sealing further comprises an intrinsic physical seal comprising a wetting of the impermeable container by said matrix metal.

42. The method of claim 29, wherein said sealing further comprises an intrinsic chemical seal comprising a reaction product of said matrix metal and said impermeable container.

43. The method of claim 29, wherein said reactive atmosphere reacts at least partially with at least one of said matrix metal, said filler material and said impermeable container, thereby resulting in said net pressure differential.

44. The method of claim 29, wherein at least a portion of said impermeable container comprises said barrier means.

45. The method of claim 29, wherein said barrier means comprises at least one material selected from the group consisting of a metal, a ceramic, a ceramic composite and a clay.

46. The method of claim 45, wherein said barrier means comprises a particulate material which is non-infiltratable under the process conditions.

47. The method of claim 29, wherein said barrier means comprises at least one material selected from the group consisting of carbon, graphite, titanium diboride, plaster of paris, alumina and silica.

48. The method of claim 29, wherein said barrier means is substantially non-wettable by said matrix metal.

49. The method of claim 29, wherein said barrier means is contained within said impermeable container.

50. The method of claim 29, wherein said barrier means is applied to said at least one surface of said permeable mass by at least one process selected from the group consisting of painting, dipping, silk screening, evaporating and sputtering.

51. The method of claim 29, wherein said barrier means comprises a flexible graphite sheet which is placed into abutting contact with said at least one surface.

52. The method of claim 29, further comprising providing a separation facilitator which enhances separation of said shaped metal matrix composite from at least one of said impermeable container, said barrier means and said matrix metal.

53. The method of claim 52, wherein said separation facilitator comprises at least one material selected from the group consisting of graphite, boron oxide and tin.

54. The method of claim 52, wherein said separation facilitator is contained within said barrier means.

55. The method of claim 29, wherein said permeable mass comprises at least one material selected from the group consisting of powders, flakes platelets, microspheres, whiskers, bubbles, fibers, particulates, fiber mats, chopped fibers, spheres, pellets, tubules and refractory cloths.

56. The method of claim 29, wherein said permeable mass comprises at least one material selected from the group consisting of oxides, carbides, borides and nitrides.

57. The method of claim 29, wherein said impermeable container comprises at least one material selected from the group consisting of a ceramic, a metal, a glass and a polymer.

58. The method of claim 57, wherein said impermeable container comprises alumina or silicon carbide.

59. The method of claim 29, wherein said reactive atmosphere comprises at least one material selected from the group consisting of an oxygen-containing atmosphere and a nitrogen-containing atmosphere.

60. The method of claim 29, wherein said matrix metal comprises aluminum and said reactive atmosphere comprises air, oxygen or nitrogen.

61. The method of claim 29, wherein said matrix metal comprises at least one of a bronze matrix metal, a copper matrix metal and a cast iron matrix metal and the reactive atmosphere comprises air, oxygen and nitrogen.

62. The method of claim 29, wherein the temperature of said reaction system is greater than the melting point of said matrix metal, but less than the volatilization temperature of said matrix metal and the melting point of said filler.

63. The method of claim 29, wherein said matrix metal comprises aluminum and said filler comprises at least one material selected from the group consisting of oxides, carbides, borides and nitrides.

64. The method of claim 29, wherein said sealed reaction system is heated to a temperature of: about 700° C.–1000° C. when said matrix metal comprises aluminum; about 1050° C.–1125° C. when said matrix metal comprises bronze or copper; and about 1250° C.–1400° C. when said matrix metal comprises cast iron.

65. The method of claim 29, further comprising directionally solidifying the formed shaped metal matrix composite body.

66. The method of claim 29, wherein said at least one glassy material comprises at least one material selected from the group consisting of boron glasses, silicon glasses and $B_2O_3$, which is at least partially molten during at least a portion of said infiltrating.

67. The method of claim 29, wherein said barrier means comprises a mold comprising at least one material selected from the group consisting of alumina, silica, vermiculite, graphite, plaster of pair and stainless steel.

68. The method of claim 67, wherein said mold also functions as said impermeable container.

69. The method of claim 21, wherein said infiltration of molten matrix metal occurs without the requirement for the application of external pressure or vacuum.

70. The method of claim 29, wherein said infiltration of molten matrix metal occurs without the requirement for the application of external pressure or vacuum.

* * * * *